US011155262B2

(12) United States Patent  (10) Patent No.: US 11,155,262 B2
Avedisov et al.  (45) Date of Patent: *Oct. 26, 2021

(54) VEHICULAR MITIGATION SYSTEM BASED ON WIRELESS VEHICLE DATA

(71) Applicant: TOYOTA JIDOSHA KABUSHIKI KAISHA, Toyota (JP)

(72) Inventors: Sergei Avedisov, Mountain View, CA (US); Gaurav Bansal, Mountain View, CA (US)

(*) Notice: Subject to any disclaimer, the term of this patent is extended or adjusted under 35 U.S.C. 154(b) by 189 days.

This patent is subject to a terminal disclaimer.

(21) Appl. No.: 16/275,170

(22) Filed: Feb. 13, 2019

(65) Prior Publication Data

US 2019/0176823 A1  Jun. 13, 2019

Related U.S. Application Data

(63) Continuation of application No. 15/403,064, filed on Jan. 10, 2017, now Pat. No. 10,252,717.

(51) Int. Cl.
*B60W 30/16* (2020.01)
*B60W 30/09* (2012.01)
(Continued)

(52) U.S. Cl.
CPC ............ *B60W 30/16* (2013.01); *B60W 30/09* (2013.01); *B60W 30/143* (2013.01);
(Continued)

(58) Field of Classification Search
CPC .... B60W 30/09; B60W 30/143; B60W 30/16; B60W 2720/10; B60W 2556/45;
(Continued)

(56) References Cited

U.S. PATENT DOCUMENTS 5,818,356 A  10/1998 Schuessler
7,167,104 B2  1/2007 DiPiazza
(Continued)

FOREIGN PATENT DOCUMENTS

GB  2405279 A * 2/2005 ............. G01S 19/11
JP  PO2001-134900  5/2001
(Continued)

OTHER PUBLICATIONS

USPTO, Non-final Office Action for U.S. Appl. No. 15/077,756, dated Jan. 11, 2019, 62 pages.
(Continued)

*Primary Examiner* — Atul Trivedi
(74) *Attorney, Agent, or Firm* — Burbage Law, P.C.; Jon-Michael Burbage; Elizabeth Ruzich

(57) ABSTRACT

The disclosure includes embodiments for modifying the acceleration of an ego vehicle based on wireless vehicle data included in a wireless message. A method includes receiving the wireless message that includes wireless vehicle data that describes one or more physical properties of a downstream vehicle. The wireless vehicle data indicates a presence of a traffic obstruction. The method includes determining a modification for an acceleration of the ego vehicle based on the wireless vehicle data and the indication of the traffic obstruction. The method includes modifying the acceleration of the ego vehicle based on wireless vehicle data compliant with the DSRC standard. The modified acceleration causes the ego vehicle to travel at a velocity consistent with a preceding vehicle and the downstream vehicle so that the ego vehicle does not collide with the preceding vehicle or the other downstream vehicle, which are in the same lane as the ego vehicle.

20 Claims, 18 Drawing Sheets

(51) Int. Cl.
*B60W 30/14* (2006.01)
*G08G 1/0967* (2006.01)
*G08G 1/0962* (2006.01)
*G08G 1/16* (2006.01)

(52) U.S. Cl.
CPC ..... *G08G 1/0962* (2013.01); *G08G 1/096708* (2013.01); *G08G 1/163* (2013.01); *G08G 1/166* (2013.01); *B60W 2420/52* (2013.01); *B60W 2554/801* (2020.02); *B60W 2554/804* (2020.02); *B60W 2556/45* (2020.02); *B60W 2556/55* (2020.02); *B60W 2720/10* (2013.01); *B60W 2754/30* (2020.02)

(58) Field of Classification Search
CPC ....... B60W 2556/55; B60W 2554/801; B60W 2554/804; B60W 2420/52; B60W 2754/30; G08G 1/0962; G08G 1/096708; G08G 1/163; G08G 1/166
USPC .......................................................... 701/96
See application file for complete search history.

(56) References Cited

U.S. PATENT DOCUMENTS

| | | | |
|---|---|---|---|
| 7,523,000 B2 | 4/2009 | Tengler et al. | |
| 8,473,144 B1 | 6/2013 | Dolgov et al. | |
| 8,849,494 B1* | 9/2014 | Herbach | B60W 60/0015 701/24 |
| 8,878,927 B2 | 11/2014 | Richardson et al. | |
| 8,965,677 B2 | 2/2015 | Breed et al. | |
| 9,253,753 B2 | 2/2016 | Rubin et al. | |
| 9,300,423 B2 | 3/2016 | Rubin et al. | |
| 9,401,086 B2 | 7/2016 | Basalamah | |
| 9,451,019 B2 | 9/2016 | Herz et al. | |
| 9,754,325 B1 | 9/2017 | Konrardy et al. | |
| 9,824,583 B2 | 11/2017 | Popple | |
| 9,937,795 B2 | 4/2018 | Konet et al. | |
| 9,940,832 B2 | 4/2018 | Bansal et al. | |
| 9,944,317 B2 | 4/2018 | Lee | |
| 10,049,570 B2 | 8/2018 | Foreman et al. | |
| 10,235,882 B1* | 3/2019 | Aoude | G08G 1/0137 |
| 10,769,953 B1* | 9/2020 | Salles | G08G 1/0112 |
| 10,909,629 B1* | 2/2021 | Madigan | G06F 11/3058 |
| 2004/0193347 A1* | 9/2004 | Harumoto | G08G 1/167 701/45 |
| 2005/0187701 A1 | 8/2005 | Baney | |
| 2005/0221759 A1* | 10/2005 | Spadafora | G08G 1/09 455/41.2 |
| 2005/0222750 A1 | 10/2005 | Tsuge et al. | |
| 2005/0222751 A1 | 10/2005 | Uyeki | |
| 2006/0142933 A1 | 6/2006 | Feng | |
| 2006/0155427 A1 | 7/2006 | Yang | |
| 2007/0027583 A1* | 2/2007 | Tamir | G08G 1/164 701/1 |
| 2007/0109111 A1* | 5/2007 | Breed | G01S 13/867 340/435 |
| 2007/0135990 A1 | 6/2007 | Seymour et al. | |
| 2007/0152804 A1 | 7/2007 | Breed et al. | |
| 2008/0077317 A1 | 3/2008 | Zabel et al. | |
| 2008/0133136 A1* | 6/2008 | Breed | B60W 50/00 701/301 |
| 2010/0030434 A1* | 2/2010 | Okabe | A61B 5/18 701/48 |
| 2010/0250132 A1 | 9/2010 | Zeng | |
| 2010/0256852 A1* | 10/2010 | Mudalige | G08G 1/22 701/24 |
| 2011/0009151 A1 | 1/2011 | Miucic | |
| 2011/0068950 A1 | 3/2011 | Flaherty | |
| 2011/0109475 A1* | 5/2011 | Basnayake | G08G 1/096783 340/902 |
| 2011/0125402 A1 | 5/2011 | Mitsugi et al. | |
| 2011/0128849 A1 | 6/2011 | Guo | |
| 2011/0160989 A1 | 6/2011 | Uyeki et al. | |
| 2011/0238306 A1 | 9/2011 | Miucic | |
| 2012/0056756 A1 | 3/2012 | Yester | |
| 2012/0083959 A1* | 4/2012 | Dolgov | B60R 1/00 701/23 |
| 2012/0283942 A1* | 11/2012 | T'Siobbel | G01C 21/26 701/410 |
| 2013/0187771 A1* | 7/2013 | Rothschild | G08G 1/096716 340/435 |
| 2013/0204520 A1 | 8/2013 | Nomura | |
| 2013/0210460 A1 | 8/2013 | Subramanian et al. | |
| 2013/0279392 A1 | 10/2013 | Rubin et al. | |
| 2013/0279393 A1* | 10/2013 | Rubin | H04L 67/12 370/312 |
| 2013/0338877 A1 | 12/2013 | Straus | |
| 2014/0045556 A1* | 2/2014 | Subramanian | B61L 25/025 455/574 |
| 2014/0195102 A1 | 7/2014 | Nathanson | |
| 2014/0210644 A1* | 7/2014 | Breed | G01S 19/17 340/905 |
| 2014/0236449 A1* | 8/2014 | Horn | B60W 30/16 701/96 |
| 2014/0358414 A1 | 12/2014 | Ibrahim et al. | |
| 2015/0025784 A1 | 1/2015 | Kastner et al. | |
| 2015/0025789 A1 | 1/2015 | Einecke et al. | |
| 2015/0170522 A1 | 6/2015 | Noh | |
| 2015/0199905 A1 | 7/2015 | Hayee et al. | |
| 2015/0224987 A1 | 8/2015 | Tachibana | |
| 2015/0235556 A1 | 8/2015 | Gordon | |
| 2015/0246672 A1* | 9/2015 | Pilutti | B60W 30/00 701/2 |
| 2015/0300834 A1 | 10/2015 | Shin et al. | |
| 2015/0371538 A1 | 12/2015 | Eichhorst | |
| 2016/0001781 A1 | 1/2016 | Fung et al. | |
| 2016/0027299 A1 | 1/2016 | Raamot | |
| 2016/0086391 A1* | 3/2016 | Ricci | G06Q 10/10 701/29.3 |
| 2016/0189544 A1* | 6/2016 | Ricci | G08G 1/0116 701/117 |
| 2016/0207530 A1 | 7/2016 | Stanek et al. | |
| 2016/0210858 A1* | 7/2016 | Foster | G08G 1/0965 |
| 2016/0223348 A1 | 8/2016 | Witte et al. | |
| 2016/0231746 A1* | 8/2016 | Hazelton | G01S 13/867 |
| 2016/0260325 A1 | 9/2016 | Modica et al. | |
| 2016/0273921 A1 | 9/2016 | Zhou et al. | |
| 2016/0313730 A1 | 10/2016 | Ricci et al. | |
| 2016/0321919 A1* | 11/2016 | Xu | G08G 1/0112 |
| 2016/0375767 A1 | 12/2016 | Konet et al. | |
| 2016/0375768 A1* | 12/2016 | Konet | G08G 1/166 348/148 |
| 2017/0032402 A1 | 2/2017 | Patsiokas et al. | |
| 2017/0036673 A1 | 2/2017 | Lee | |
| 2017/0069208 A1 | 3/2017 | Nair et al. | |
| 2017/0089717 A1 | 3/2017 | White et al. | |
| 2017/0116849 A1 | 4/2017 | Foreman et al. | |
| 2017/0124864 A1* | 5/2017 | Popple | B60W 10/20 |
| 2017/0124869 A1* | 5/2017 | Popple | G08G 1/087 |
| 2017/0270361 A1 | 9/2017 | Puttagunta et al. | |
| 2017/0274820 A1 | 9/2017 | Goudy et al. | |
| 2017/0274821 A1 | 9/2017 | Goudy et al. | |
| 2017/0276504 A1 | 9/2017 | Lu et al. | |
| 2017/0278388 A1 | 9/2017 | Bansal et al. | |
| 2017/0278401 A1 | 9/2017 | Probert et al. | |
| 2017/0301238 A1* | 10/2017 | Brandriff | B60R 1/00 |
| 2017/0308094 A1 | 10/2017 | Abe et al. | |
| 2017/0337816 A1 | 11/2017 | Lu et al. | |
| 2017/0364070 A1 | 12/2017 | Oba | |
| 2017/0365166 A1 | 12/2017 | Lu et al. | |
| 2017/0369055 A1* | 12/2017 | Saigusa | G08G 1/0116 |
| 2018/0015918 A1 | 1/2018 | Bae et al. | |
| 2018/0029533 A1 | 2/2018 | Goudy et al. | |
| 2018/0050673 A1 | 2/2018 | D'Sa et al. | |
| 2018/0056999 A1 | 3/2018 | Damiani et al. | |
| 2018/0194352 A1* | 7/2018 | Avedisov | B60W 30/16 |
| 2019/0012912 A1* | 1/2019 | Kim | G08G 1/096716 |
| 2019/0012919 A1* | 1/2019 | Brandriff | G08G 1/167 |
| 2019/0143968 A1* | 5/2019 | Song | B60W 30/09 701/301 |
| 2019/0152473 A1* | 5/2019 | Ohsugi | G06K 9/00805 |

(56) References Cited

U.S. PATENT DOCUMENTS

| | | | | |
|---|---|---|---|---|
| 2019/0179320 A1* | 6/2019 | Pacala | ................... | G08G 1/166 |
| 2019/0241198 A1* | 8/2019 | Mori | ................... | B60W 50/14 |
| 2019/0243371 A1* | 8/2019 | Nister | ................... | G05D 1/0231 |
| 2019/0283746 A1* | 9/2019 | Shalev-Shwartz | ... | G05D 1/0246 |
| 2019/0291726 A1* | 9/2019 | Shalev-Shwartz | .... | B60W 10/20 |
| 2019/0291728 A1* | 9/2019 | Shalev-Shwartz | .... | B60W 10/18 |
| 2019/0333386 A1* | 10/2019 | Horita | ................... | G08G 1/166 |
| 2019/0367019 A1* | 12/2019 | Yan | ................... | G05D 1/027 |
| 2019/0367020 A1* | 12/2019 | Yan | ................... | G06K 9/6297 |
| 2019/0382023 A1* | 12/2019 | Takeda | ............ | B60W 30/18163 |
| 2020/0004269 A1* | 1/2020 | Oba | ................... | G08G 1/09675 |
| 2020/0057453 A1* | 2/2020 | Laws | ................... | B60W 10/20 |
| 2020/0058218 A1* | 2/2020 | Julian | ................... | G08G 1/0125 |
| 2020/0180612 A1* | 6/2020 | Finelt | ................... | B60W 30/09 |
| 2020/0180633 A1* | 6/2020 | Wu | ................... | G08G 1/167 |
| 2020/0242922 A1* | 7/2020 | Dulberg | ........... | G08G 1/096783 |
| 2020/0242924 A1* | 7/2020 | Publicover | ............. | G08G 1/147 |
| 2020/0307580 A1* | 10/2020 | Kobayashi | ............ | B60W 30/09 |
| 2020/0324795 A1* | 10/2020 | Bojarski | ......... | B60W 60/00274 |
| 2020/0372795 A1* | 11/2020 | Szilagyi | ................ | H04W 4/023 |

FOREIGN PATENT DOCUMENTS

| | | | | |
|---|---|---|---|---|
| JP | 2003-248891 | 9/2003 | | |
| JP | 2005-041432 | 2/2005 | | |
| JP | PO2005-274339 | 10/2005 | | |
| JP | PO2006-119068 | 5/2006 | | |
| JP | PO2006-162349 | 6/2006 | | |
| JP | PO2009-163584 | 7/2009 | | |
| JP | PO2009-210467 | 9/2009 | | |
| JP | PO2012-094135 | 5/2012 | | |
| JP | PO2013-524168 | 6/2013 | | |
| JP | 2015-022758 | 2/2015 | | |
| JP | PO2015-090345 | 5/2015 | | |
| JP | 2015-225558 | 12/2015 | | |
| WO | WO-2016093535 A1 * | 6/2016 | ......... | B60R 11/0235 |
| WO | WO-2017003013 A1 * | 1/2017 | ....... | G08G 1/096775 |

OTHER PUBLICATIONS

Jiang, et al., "Design of 5.9GHz DSRC-based Vehicular Safety Communication," IEEE Wireless Communications vol. 13—Issue 5, pp. 36-43, Oct. 2006, IEEE.

Goodall, "Traffic Signal Control with Connected Vehicles," http://bit.ly/1EQSShj, pp. 1-224, downloaded on Mar. 22, 2016.

Ansari, et al., "Vehicle-to-Vehicle Real-Time Relative Positioning Using 5.9 GHz DSRC Media," Vehicular Technology Conference (VTC Fall), 2013 IEEE 78th, pp. 1-7, Sep. 2-5, 2013.

USPTO, Final Office Action for U.S. Appl. No. 15/077,727, dated Oct. 3, 2017, 12 pages.

USPTO, Non-final Office Action for U.S. Appl. No. 15/077,727, dated Jun. 26, 2017, 23 pages.

USPTO, Final Office Action for U.S. Appl. No. 15/077,756, dated Nov. 2, 2017, 61 pages.

USPTO, Non-final Office Action for U.S. Appl. No. 15/077,756, dated Mar. 27, 2018, 69 pages.

USPTO, Non-final Office Action for U.S. Appl. No. 15/077,756, dated May 31, 2017, 49 pages.

U.S. Appl. No. 15/912,297, filed Mar. 5, 2018, 185 pages.

USPTO, Non-final Office Action for U.S. Appl. No. 15/912,297, dated Aug. 27, 2018, 30 pages.

USPTO, Final Office Action for U.S. Appl. No. 15/077,756, dated Sep. 20, 2018, 69 pages.

USPTO, Non-final Office Action for U.S. Appl. No. 15/912,297, dated Dec. 26, 2018, 15 pages.

* cited by examiner

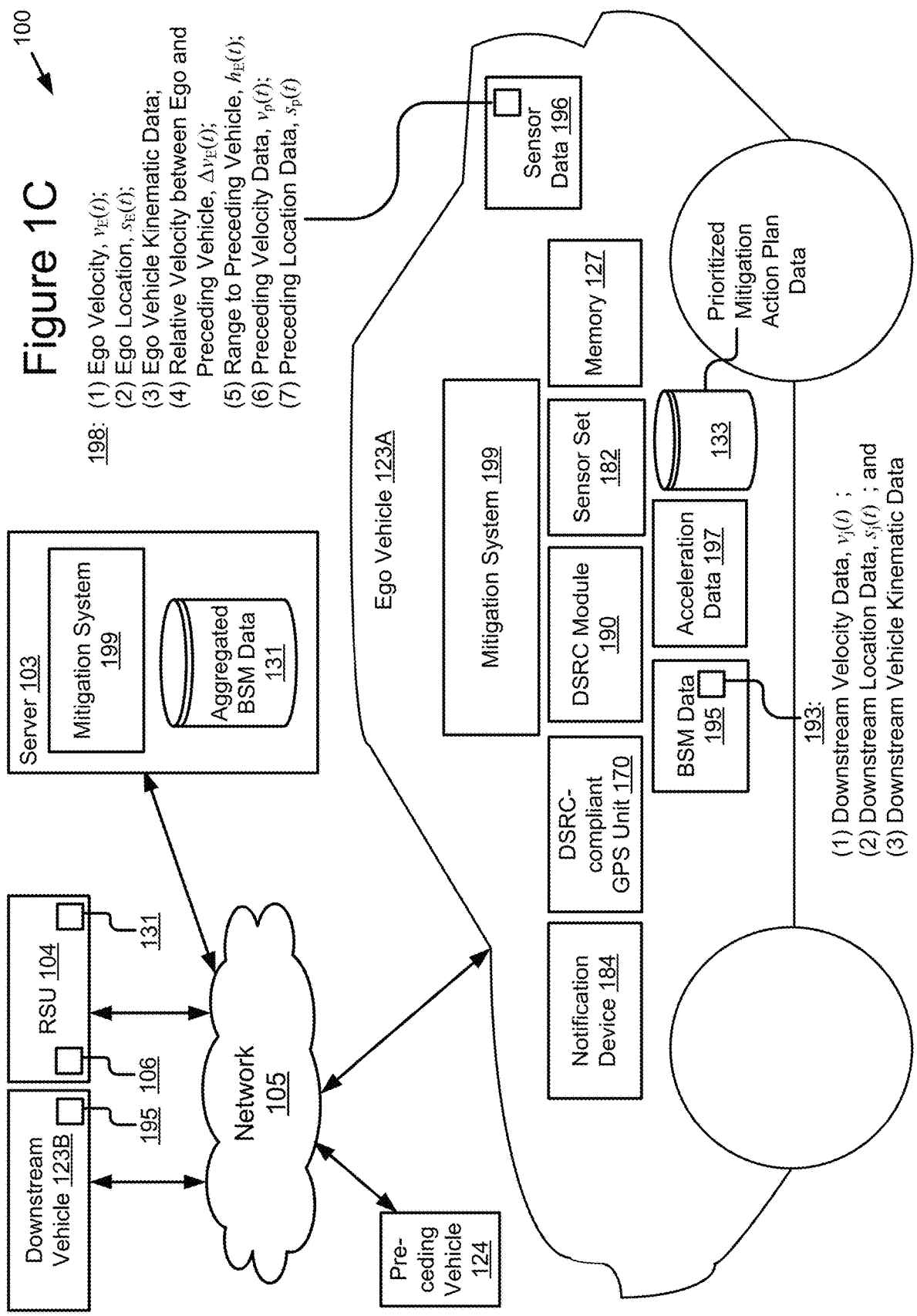

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) Location Data Describing the Location of the Vehicle, where the Location Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle (e.g., path history data).

Figure 5A

BSM DATA 195

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 5B

```
                                                                    700
                                                                   ↙
┌─────────────────────────────────────────────────────────────────────┐
│   Receiving, via a DSRC module of the ego vehicle, a DSRC-based     │
│ wireless message that includes wireless vehicle data and is         │
│ wirelessly received via a DSRC channel of the DSRC module, wherein  │
│ the DSRC-based wireless message and the wireless vehicle data are   │
│ compliant with a DSRC standard regulating a transmission of the     │
│ DSRC-based wireless message and content of the wireless vehicle     │
│ data. 701                                                           │
└─────────────────────────────────────────────────────────────────────┘
                                  ↓
┌─────────────────────────────────────────────────────────────────────┐
│ Determining that the wireless vehicle data describes a presence of a │
│ traffic obstruction that is at a location downstream of the ego     │
│ vehicle and within a same lane of travel as the ego vehicle,        │
│ wherein the location is described by the wireless vehicle data with │
│ lane-level accuracy. 703                                            │
│                                                                     │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│   Determining a downstream velocity of a downstream vehicle that is │
│  │ located, when compared to the preceding vehicle, further         │
│    downstream of the ego vehicle. The downstream velocity is        │
│  │ described by the wireless vehicle data. For example, the         │
│    wireless vehicle data includes BSM data describing the           │
│  │ downstream velocity for the downstream vehicle. 704              │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────┘
                                  ↓
┌─────────────────────────────────────────────────────────────────────┐
│  Determining a preceding velocity of a preceding vehicle that is    │
│         traveling directly in front of the ego vehicle. 705         │
└─────────────────────────────────────────────────────────────────────┘
                                  ↓
                                 (A)
```

Figure 7A

VEHICULAR MITIGATION SYSTEM BASED ON WIRELESS VEHICLE DATA

CROSS-REFERENCE TO RELATED APPLICATIONS

This patent application is a continuation of U.S. patent application Ser. No. 15/403,064, entitled "Vehicular Mitigation System Based on Wireless Vehicle Data" and filed on Jan. 10, 2017, the entirety of which is hereby incorporated by reference.

BACKGROUND

The specification relates to a mitigation system of an ego vehicle modifying the velocity of the ego vehicle based on wireless vehicle data.

Drivers of vehicles do not want to be at risk from downstream vehicles that are traveling at slower velocities relative to their vehicles. A downstream vehicle is a vehicle traveling on a same roadway as the driver's vehicle and ahead of the driver's vehicle on that roadway. These slower velocities may be due to an obstruction in a roadway or a lane of a roadway. Examples of an obstruction may include one or more of the following: potholes; wrecks; animals; people; roadway debris; ice patches; puddles; or any other roadway condition that may cause a driver to modify the operation of the downstream vehicle to avoid the obstruction or reduce an impact of the obstruction on their vehicle or travel.

Sometimes a driver of a downstream vehicle may operate their vehicle at a slower velocity for reasons independent of an obstruction. For example, it may be the driver's habit or preference to drive at a slower speed relative to other vehicles. In these situations, the downstream vehicle may itself be an example of an obstruction for other vehicles that are traveling in the same lane or roadway at faster speeds relative to the downstream vehicle.

SUMMARY

Described are embodiments that include a system, method and a computer program product for mitigating the effect of one or more downstream vehicle on an ego vehicle based on wireless vehicle data included in a wireless message received by the ego vehicle. The one or more downstream vehicles may be part of a traffic jam. The ego vehicle may be traveling faster than the one or more downstream vehicles.

In some embodiments, the ego vehicle is a connected vehicle that is equipped with hardware or software operable to enable it to send and receive Dedicated Short Range Communication ("DSRC") messages as well as other wireless messages such as Wi-Fi messages, cellular messages, millimeter wave messages, full-duplex wireless communication messages and any other wireless messages which optionally includes wireless vehicle data. The wireless vehicle data includes digital data included in one or more wireless messages as specified by a standard that regulates the content and format of the one or more wireless messages. For example, the wireless vehicle data includes DSRC data included in a DSRC message as specified by the DSRC standard.

In some embodiments, the DSRC standard includes one or more of the following: EN ISO 14906:2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review).

In some embodiments, the DSRC message may be a Basic Safety Message ("BSM") that is transmitted via DSRC.

In some embodiments, the ego vehicle and one or more of the downstream vehicles are DSRC-equipped vehicles.

In some embodiments, a DSRC-equipped vehicle may include a vehicle that includes one or more of the following elements: a DSRC transceiver and any software or hardware necessary to encode and transmit a DSRC message; a DSRC receiver and any software or hardware necessary to receive and decode a DSRC message; and a DSRC-compliant Global Positioning System (a "DSRC-compliant GPS system" or a "DSRC-compliant GPS unit").

A DSRC-compliant GPS unit can provide location data describing the location of a vehicle with lane-level accuracy. Lane-level accuracy may mean that the location of a vehicle is described so accurately that the vehicle's lane of travel may be accurately determined. A conventional GPS system is unable to determine the location of a vehicle with lane-level accuracy. For example, a typical lane of a roadway is approximately 3 meters wide. However, a conventional GPS system may only have an accuracy of plus or minus 10 meters relative to the actual location of the vehicle.

A DSRC-compliant GPS unit may include hardware that wirelessly communicates with a GPS satellite to retrieve location data that describes a location of a vehicle with a precision that is compliant with the DSRC standard. The DSRC standard requires that location data be precise enough to infer if two vehicles are in the same lane. A DSRC-compliant GPS unit may be operable to identify, monitor and track its two-dimensional position within 1.5 meters of its actual position 68% of the time under an open sky. Since lanes of a roadway are typically no less than 3 meters wide, whenever the two-dimensional error of the location data is less than 1.5 meters the mitigation system described herein may analyze the location data (for example, one or more of the following: ego location data, $s_E(t)$; or downstream location data $s_j(t)$; or preceding location data, $s_p(t)$) provided by the DSRC-compliant GPS unit and determine which lane of the roadway the vehicle is traveling in based on the relative positions of two or more vehicles on the roadway. In this way, the DSRC-compliant GPS unit may beneficially provide location data with lane-level accuracy.

In some embodiments, devices other than vehicles may be DSRC-equipped. For example, a roadside unit ("RSU") or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use wireless vehicle data included in one or more DSRC-based wireless messages (for example: a DSRC message; a DSRC probe; and a BSM) to provide an estimate of whether one or more traffic obstructions are present on the roadway. Embodiments of the mitigation system described herein may provide a notification to drivers about the presence of the obstruction. The notification may be configured to occur in sufficient time for the driver to safely respond to the obstruction.

No other technologies utilize wireless vehicle data included in a DSRC-based wireless message transmitted in accordance with the DSRC standard, and including data compliant with the DSRC standard, to: (1) identify a traffic obstruction or one or more slower moving downstream vehicles; (2) take one or more steps to mitigate one or more negative effects of the identified traffic obstruction or slower moving downstream vehicle; (3) identify which lanes of a roadway are affected by the identified traffic obstruction or slower moving vehicle; and (4) cause a vehicle to modify their journey so that the vehicle travels in a lane which is less affected by the identified traffic obstruction or slower moving vehicle. Some technologies may attempt to achieve one or more of these benefits of the mitigation system described herein, but these technologies are not technically possible in the real world because they rely on the transmission of messages or data which are incompatible with the DSRC standard such that they could never be implemented while also using DSRC-based wireless messages (such as DSRC messages, DSRC probes or BSMs) to transmit wireless vehicle data.

An ego vehicle includes a mitigation system. In some embodiments, the mitigation system receives wireless vehicle data via a wireless message (e.g., a DSRC message or a BSM). The mitigation system may receive a plurality of wireless messages from a plurality of downstream vehicles, each wireless message including wireless vehicle data that describes the downstream vehicle which transmitted the wireless message. The plurality of downstream vehicles may include a preceding vehicle which is traveling directly in front of the ego vehicle.

In some embodiments, the wireless vehicle data includes digital data that describes one or more of the following: (1) the identity of downstream vehicle (e.g., a unique identifier of the downstream vehicle); (2) the location of downstream vehicle (e.g., location data having lane-level accuracy); (3) the velocity of the downstream vehicles; (4) the identity of a preceding vehicle; (5) the location of the preceding vehicle; and (6) the velocity of the preceding vehicle. For example, the wireless message is a BSM that includes BSM data (e.g., see FIGS. 5A and 5B) or a DSRC message that includes data similar to the BSM data. The mitigation system receives the wireless message and parses out the wireless vehicle data. This parsing may be repeated for multiple different wireless messages if a plurality of wireless vehicle messages that are received during a predetermined time frame.

In some embodiments, the mitigation system analyzes the wireless vehicle data to identify or estimate a presence of a downstream traffic obstruction (or one or more downstream vehicles that are traveling in the same lane as the ego vehicle and at a velocity slower than the ego vehicle or some predetermined threshold for velocities which indicates the presence of the traffic obstruction) and determine an estimate of whether the traffic obstruction (or the one or more slower moving downstream vehicles) is located downstream on the roadway relative to the location of the ego vehicle and in the same lane of travel as the ego vehicle.

In some embodiments, the mitigation system takes mitigating action responsive to identifying the traffic obstruction (or one or more downstream vehicles that are traveling in the same lane as the ego vehicle and at a velocity slower than the ego vehicle or some predetermined threshold for velocities which indicates the presence of the traffic jam). A mitigating action includes, among other things, smoothly decelerating the ego vehicle (or suggesting that the driver do so) so that the ego vehicle approaches the traffic obstruction at a speed that is consistent with the speed of the other vehicles within the traffic jam, such as the preceding vehicle which is traveling directly in front of the ego vehicle and one or more other downstream vehicles. In this way the ego vehicle does not collide with one or more of the following: the preceding vehicle; one or more downstream vehicles that are traveling in the same lane of travel as the ego vehicle; and one or more downstream vehicles that are traveling in a different lane of travel as the ego vehicle. For example, the mitigation system causes the ego vehicle to decelerate such that the ego velocity is less than or substantially equal to a preceding velocity of the preceding vehicle and less than or substantially equal to the downstream velocity of one or more downstream vehicles. The downstream velocity may include the slowest velocity from a set of downstream velocities (e.g., the slowest velocity for one or more downstream vehicles included in a set of downstream vehicles) such that the ego velocity is less than or substantially equal to the slowest of the downstream velocities for the set of downstream vehicles.

In some embodiments, the mitigation action includes the mitigation system determining an acceleration for the ego vehicle which will cause the ego vehicle to decelerate responsive to the identified traffic obstruction (or one or more slower moving downstream vehicles). For example, the mitigation system determines an acceleration of the ego vehicle (which is a negative number if the ego vehicle is decelerating) based at least in part on (1) a range separating the ego vehicle from the traffic obstruction (or the one or more downstream vehicles, which may include the preceding vehicle) and (2) other data included in the wireless messages received from the plurality of downstream vehicles. See, for example, FIGS. 1D, 1E and 1F, where "$a_E(t)$" is the acceleration of the ego vehicle which is determined by the mitigation system as part of the mitigating action.

In some embodiments, the migration system includes an Advanced Driver Assistance System ("ADAS system"). The mitigation system may provide digital data that describes the determined value for $a_E(t)$ to the ADAS system. The determined value for $a_E(t)$ may be described by modification data or acceleration data as described herein. The mitigation system executes or engages the ADAS system which causes the ego vehicle to slow down or speed up as indicated by the determined value for $a_E(t)$.

In some embodiments, the mitigation system provides a notification to the driver of the ego vehicle that describes the identified condition (e.g., the traffic obstruction) or a recommended mitigating action. For example, the mitigation system provides digital data to the infotainment system of the ego vehicle which causes the infotainment system to display a visual message via an electronic display of the infotainment system or provide an audible message via one or more speakers of the ego vehicle. This message may describe the traffic obstruction and the recommended mitigating action.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method executed by an onboard vehicle computer system of an ego vehicle, the method including: receiving, via a DSRC module of the ego vehicle, a DSRC-based wireless message that includes wireless vehicle data and is wirelessly received via a DSRC channel of the DSRC module, where the DSRC-based wireless message and the wireless vehicle data are compliant with a DSRC standard regulating a transmission of the DSRC-based wireless message and content of the wireless vehicle data; determining that the wireless vehicle data describes a presence of a traffic obstruction that is at a location downstream of the ego vehicle and within a same lane of travel as the ego vehicle, where the location is described by the wireless vehicle data with lane-level accuracy; determining a preceding velocity of a preceding vehicle that is traveling directly in front of the ego vehicle; and modifying an ego velocity of the ego vehicle based on the preceding velocity and the presence of the traffic obstruction, where the ego velocity is modified by the onboard vehicle computer system so that the ego velocity is substantially equal to the preceding velocity prior to the ego vehicle arriving at the location of the traffic obstruction and the ego vehicle does not collide with a set of downstream vehicles including the preceding vehicle. Other embodiments of this aspect include corresponding computer systems, apparatus, and computer programs recorded on one or more computer storage devices, each configured to perform the actions of the methods.

Implementations may include one or more of the following features. The method further including: determining a downstream velocity of a downstream vehicle that is located, when compared to the preceding vehicle, further downstream of the ego vehicle than the preceding vehicle; and where modifying the ego velocity includes modifying the ego velocity of the ego vehicle based on the preceding velocity, the downstream velocity and the presence of the traffic obstruction, where the ego velocity is modified by the onboard vehicle computer system so that the ego velocity is less than or substantially equal to the preceding velocity within an initial time period and less than or substantially equal to the downstream velocity and the preceding velocity prior to the ego vehicle arriving at the location of the traffic obstruction so that the ego vehicle does not collide with the preceding vehicle or the downstream vehicle. The method where the onboard vehicle computer system does not have knowledge of a wireless network which transmits data among the ego vehicle and one or more connected devices. Implementations of the described techniques may include hardware, a method or process, or computer software on a computer-accessible medium.

One general aspect includes a method executed by an onboard vehicle computer system of an ego vehicle that is DSRC-equipped, the method including: receiving a wireless message that includes wireless vehicle data that is compliant with a DSRC standard; determining that the wireless vehicle data describes a presence of a traffic obstruction that is at a location downstream of the ego vehicle and within a same road of travel as the ego vehicle; and modifying, by the onboard vehicle computer system, an ego velocity of the ego vehicle prior to the ego vehicle arriving at the location. Other embodiments of this aspect include corresponding computer systems, apparatus, and computer programs recorded on one or more computer storage devices, each configured to perform the actions of the methods.

Implementations may include one or more of the following features. The method where the wireless message is a DSRC-based wireless message. The method where the wireless message is transmitted by one or more of a preceding vehicle, a downstream vehicle, a roadside unit and a server. The method where the wireless vehicle data describes one or more of the preceding vehicle and the downstream vehicle. The method where the wireless vehicle data includes BSM data. The method where the wireless vehicle data describes the location with lane-level accuracy. The method where lane-level accuracy includes the location being described by the wireless vehicle data with an accuracy of substantially plus or minus 1.5 meters where a specific lane of a roadway which is traveled in by the downstream vehicle at a specific time is substantially 3 meters wide. The method further including determining a preceding velocity of a preceding vehicle that is traveling directly in front of the ego vehicle, where modifying the ego velocity includes modifying the ego velocity based on the preceding velocity and the presence of the traffic obstruction so that the ego velocity is less than or substantially equal to the preceding velocity (or a downstream velocity of a set of ego vehicles) prior to the ego vehicle arriving at the location of the traffic obstruction. The method further including executing an onboard sensor of the ego vehicle to generate sensor data describing one or more velocities of one or more vehicles traveling on the same road of travel. The method where the onboard sensor includes one or more of a range finder sensor and a RADAR sensor. The method where the sensor data describes the ego velocity and the preceding velocity at a specific time. The method where the wireless vehicle data describes a velocity of one or more downstream vehicles at one or more specific times, a location of one or more downstream vehicles with lane-level accuracy at the one or more specific times and one or more kinematics of the one or more downstream vehicles at the one or more specific times. The method where determining that the wireless vehicle data describes the traffic obstruction includes analyzing the wireless vehicle data to identify the presence of the traffic obstruction based on one or more patterns of behavior of the one or more downstream vehicles over the one or more specific times. The method further including the onboard vehicle computer system providing acceleration data to an ADAS system of the ego vehicle, where the acceleration data describes an acceleration for modifying the ego velocity of the ego vehicle, and the ADAS system modifying the acceleration of the ego vehicle so that the ego velocity is less than or substantially equal to one or more of a preceding velocity of a preceding vehicle traveling directly in front of the ego vehicle in a same lane of travel as the ego vehicle and a downstream velocity of a set of downstream vehicles (where the downstream velocity is the average velocity among the downstream vehicles included in the set or the minimum velocity of the downstream vehicles included in the set). The method where the method is executed at a specific time described by the wireless vehicle data and the method is repeated substantially every 0.10 seconds based on new wireless vehicle data for a new wireless message, where the new wireless vehicle data describes a new time that is substantially 0.10 seconds subsequent to the specific time so that the ego velocity gradually decreases as the ego vehicle approaches the traffic obstruction. Implementations of the described techniques may include hardware, a method or process, or computer software on a computer-accessible medium.

One general aspect includes a system of a DSRC-equipped ego vehicle including: a communication unit that is operable to receive a wireless message that includes DSRC-based wireless vehicle data; an onboard vehicle computer system of the ego vehicle that is communicatively coupled to the communication unit and operable to receive the DSRC-based wireless vehicle data from the communication unit, the onboard vehicle computer system including a non-transitory memory storing computer code that, when executed by the onboard vehicle computer system, causes the onboard vehicle computer system to: determine a modification for a velocity of the ego vehicle based on a traffic obstruction described by the DSRC-based wireless vehicle data; provide modification data describing the modification to an ADAS system of the ego vehicle; and execute the ADAS system based on the modification data so that the velocity of the ego vehicle is modified based on receipt of the DSRC-based wireless vehicle data prior to the ego vehicle arriving at the traffic obstruction. Other embodiments of this aspect include corresponding computer systems, apparatus, and computer programs recorded on one or more computer storage devices, each configured to perform the actions of the methods.

Implementations may include one or more of the following features. The system where the wireless message is a BSM. The system where the modification data describes a negative value for an acceleration of the ego vehicle to be achieved by the ego vehicle during a period of time specified by the modification data so that the velocity of the ego vehicle is less than a preceding velocity of a preceding vehicle prior to ego vehicle colliding with the preceding vehicle (or less than the downstream velocity of the set of downstream vehicles prior to the ego vehicle arriving at the location of the traffic obstruction). The period of time includes an estimated time before the ego vehicle collides with the preceding vehicle based on the relative velocity of the ego vehicle and the preceding vehicle as sell as the range or distance separating the ego vehicle from the preceding vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 1A through 1C are block diagrams illustrating operating environments for an ego vehicle including a mitigation system according to some embodiments.

FIG. 5A is a block diagram illustrating an example of BSM data according to some embodiments.

FIG. 5B is a block diagram illustrating an example of BSM data according to some embodiments.

FIGS. 7A and 7B are block diagrams illustrating example method for modifying the ego velocity of an ego vehicle based on wireless vehicle data according to some embodiments.

DETAILED DESCRIPTION

Figure 1A:
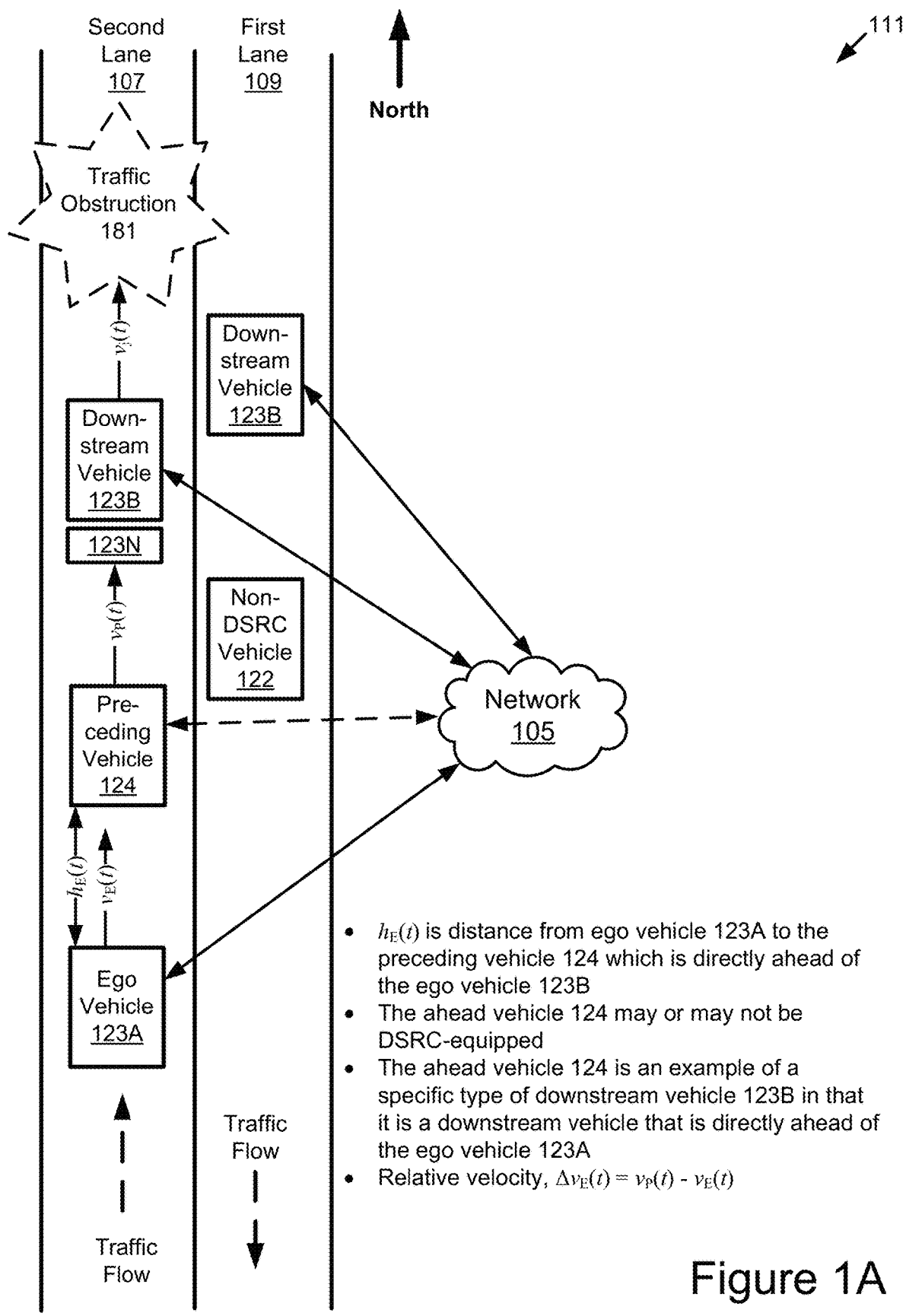

Assume that a vehicle ("an ego vehicle") is traveling down a roadway. One or more vehicles downstream on that roadway (one or more "downstream vehicles") may be driving at a reduced velocity relative to the ego vehicle. For example, the one or more downstream vehicles may be stuck in a traffic jam. The downstream vehicles include a preceding vehicle. The preceding vehicle is the vehicle directly in front of the ego vehicle. The preceding vehicle is located in the same lane of travel as the ego vehicle. The velocities of these vehicles may be zero or substantially zero.

It would be beneficial if the one or more downstream vehicles could communicate the ego vehicle to provide a warning about the presence the traffic jam or their velocities and the ego vehicle was equipped to automatically take a mitigation action. For example, the ego vehicle could smoothly decelerate so that by the time the ego vehicle reaches the traffic jam the velocity of the ego vehicle (herein the "ego velocity") matches or substantially matches the velocity of the preceding vehicle or the downstream vehicles stuck in the traffic jam (e.g., the downstream velocity or the preceding velocity of the vehicle immediately in front of the ego vehicle), so that the ego velocity is consistent with one or more of the downstream velocity and the velocity of the preceding vehicle (herein the "preceding velocity"). The embodiments of the mitigation system described herein solve this problem.

Described herein is a mitigation system and method implemented by the mitigation system for using BSM data communicated wirelessly through DSRC messages, including BSMs, to provide an estimate of whether a traffic jam is downstream on a roadway for a vehicle. The BSM data is communicated via a Basic Safety Message ("BSM message") that is regularly communicated several times per second (e.g., every 0.10 seconds) by all vehicles that are equipped with DSRC because this message is a requirement of the DSRC standard.

The disclosure includes embodiments for modifying the acceleration of an ego vehicle based on wireless vehicle data included in a wireless message, wherein the wireless vehicle data is compliant with the Dedicated Short Range Communication ("DSRC") standard. A method includes receiving the wireless message that includes wireless vehicle data that describes one or more physical properties of a set of downstream vehicles. The set of downstream vehicles includes one or more vehicles located downstream relative to the location of the ego vehicle. The downstream vehicle may be a preceding vehicle traveling directly in front of the ego vehicle or another vehicle located downstream of the ego vehicle. The wireless vehicle data indicates a presence of a traffic obstruction. The method includes determining a modification for an acceleration of the ego vehicle based on the wireless vehicle data and the indication of the traffic obstruction. In some embodiments, the wireless vehicle data describes one or more physical properties of a downstream vehicle that is not the preceding vehicle and the method includes using one or more onboard sensors to determine one or more of a velocity and a location of the preceding vehicle. The method includes modifying the acceleration of the ego vehicle based on wireless vehicle data compliant with the DSRC standard. In some embodiments, the modified acceleration causes the ego vehicle to travel at a velocity consistent with the preceding vehicle so the ego vehicle does not collide with the preceding vehicle. In some embodiments, the modified acceleration causes the ego vehicle to travel at a velocity consistent with the set of downstream vehicles so the ego vehicle does not collide with the set of downstream vehicles while also not colliding with the preceding vehicle.

Examples of Mitigating Action

After identifying the presence of a traffic jam (or one or more downstream vehicles traveling in the same lane as the ego vehicle and at a slower velocity relative to the ego vehicle), the mitigation system may cause the vehicle (or an ADAS system of the mitigation system) to take a mitigating action responsive to identifying the presence of the traffic jam (or the one or more slower moving downstream vehicles).

In some embodiments, the mitigating action may include smoothly decelerating the ego vehicle (or suggesting that the driver do so) so that the ego vehicle approaches the traffic jam at a speed that is consistent with the other downstream vehicles within the traffic jam, including the preceding vehicle (or perhaps, in an alternative embodiment, at a speed tailored to help decrease the severity of the traffic jam if implemented by other downstream vehicles in the traffic jam, some of which may also be equipped with a mitigation system as described herein). If the ego vehicle is an autonomous vehicle, the mitigation system may cause the autonomous vehicle to smoothly slow down as the autonomous vehicle approaches the traffic jam and match the speed of the downstream vehicles that are stuck in the traffic jam, including the speed of the preceding vehicle which is immediately in front of the ego vehicle.

Other mitigation actions include changing the lane of travel of the ego vehicle to be a lane less affected by the traffic jam or changing the roadway of travel of the ego vehicle to be a roadway less affected by the traffic jam.

In some embodiments, the mitigation system may provide the driver with a notification of the presence of the traffic jam or a mitigation action such as slowing down to a specified speed or changing the lane or roadway of travel. The driver may initiate the steps of slowing down or changing the lane or roadway of travel based on this notification, or the ADAS system of the mitigation system may implement these steps.

Examples of a Notification

The notification provided to the driver of the ego vehicle may include a visual notification such as a graphical user interface ("GUI"), an audio notification such as audio generated by one or more speakers or a combination of a visual notification and an audio notification provided simultaneously or contemporaneously.

The visual notification may be provided by a heads-up display unit or an electronic panel. The heads-up display unit may include a three-dimensional heads-up display unit such as the one described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference. The electronic panel may be an element of a head-unit or an infotainment system installed in the vehicle.

The audio notification may be provided by one or more speakers that are operated by the head-unit, infotainment system or navigation system of the vehicle.

In some embodiments, the mitigation system provides the notification in sufficient time for the driver or an ADAS system to safely respond to the traffic jam.

Examples of a Wireless Message

Vehicles are increasingly equipped with DSRC. A vehicle equipped with DSRC may be referred to as "DSRC-equipped." A DSRC-equipped vehicle may include a DSRC antenna and any hardware of software necessary to send and receive DSRC messages, generate DSRC messages and read DSRC messages. For example, a DSRC-equipped vehicle may include any hardware or software necessary to receive a DSRC message, retrieve data included in the DSRC message and read the data included in the DSRC message.

The one or more wireless messages may include a DSRC message. There are many types of DSRC messages. One type of DSRC message is known as a BSM. DSRC-equipped vehicles broadcast a BSM at a regular interval. The interval may be user adjustable.

A BSM includes BSM data. The BSM data describes attributes of the vehicle that originally transmitted the BSM. Vehicles equipped with DSRC may broadcast BSMs at an adjustable rate. In some embodiments, the rate may be once every 0.10 seconds. The BSM includes BSM data that describes, among other things, one or more of the following: (1) the path history of the vehicle that transmits the BSM; (2) the speed of the vehicle that transmits the BSM; and (3) the location data (sometimes referred to as "global positioning system data" or "GPS data") describing a location of the vehicle that transmits the BSM. FIGS. 5A and 5B depict examples of BSM data according to some embodiments. FIGS. 5A and 5B are described below.

In some embodiments, DSRC-equipped vehicles may probe other DSRC-equipped vehicles/devices along the roadway for information describing their current and future conditions, including their path history and future path. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices). This BSM data or DSRC probe data may include an identifier of its source and the location of the source or any traffic events described by the BSM data or DSRC probe data.

Digital data describing information similar or the same as the information described by the BSM data may be included in a DSRC message or a DSRC probe. In this way, a DSRC message or a DSRC probe may be said to include BSM data.

In some embodiments, the DSRC-enabled vehicles will include a DSRC-compliant GPS unit. The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

A DSRC-based wireless message is a wireless message whose transmission and content (e.g., data) is compliant with the DSRC standard that governs the transmission and content of DSRC-based wireless messages. The following are examples of a DSRC-based wireless message: a BSM; a DSRC message; and a DSRC probe. A DSRC-based message is transmitted and received via a DSRC channel of a wireless network such as the network 105 described below with reference to FIG. 1C.

Another type of wireless message is a full-duplex wireless message described in U.S. patent application Ser. No. 14/471,387 filed on Aug. 28, 2014 and entitled "Full-Duplex Coordination System," the entirety of which is herein incorporated by reference. Digital data describing information similar or the same as the information described by the BSM data may be included in a full-duplex wireless message. In this way, a full-duplex message may be said to include BSM data.

In some embodiments, the ego vehicle described herein is preferably DSRC-equipped. The preceding vehicle may or may not be DSRC-equipped.

Examples of Lane-Level Accuracy

Vehicles are also increasingly manufactured to include GPS-based navigation systems. A GPS-based navigation system may provide navigation routes to a driver that are based on location data and knowledge about queue lengths along roadways.

Lane-level accuracy may mean that the location of a vehicle is described so accurately that the vehicle's lane of travel may be accurately determined. A conventional GPS system is unable to determine the location of a vehicle with lane-level accuracy. For example, a typical lane of a roadway is approximately 3 meters wide. However, a conventional GPS system may only have an accuracy of plus or minus 10 meters relative to the actual location of the vehicle.

A DSRC-compliant GPS unit can provide location data describing the location of a vehicle with lane-level accuracy. For example, a DSRC-compliant GPS unit of a downstream vehicle can provide downstream location data ("$s_j(t)$") describing a location of the downstream vehicle with lane-level accuracy and a DSRC-compliant GPS unit of an ego vehicle can provide ego location data ("$s_E(t)$") describing a location of the ego vehicle with lane-level accuracy. In this way, the mitigation system can analyze the downstream location data and the ego location data to determine whether an downstream vehicle and an ego vehicle are traveling in a same lane of a roadway.

A DSRC-compliant GPS unit includes hardware that wirelessly communicates with a GPS satellite to retrieve location data that describes a location of a vehicle with a precision that is compliant with the DSRC standard. The DSRC standard requires that location data be precise enough to infer if two vehicles are in the same lane. The lane may be a lane of a roadway such as those depicted in FIGS. 1A and 1B.

A DSRC-compliant GPS unit is operable to identify, monitor and track its two-dimensional position within 1.5 meters of its actual position 68% of the time under an open sky. Since lanes of a roadway are typically no less than 3 meters wide, whenever the two-dimensional error of the location data is less than 1.5 meters the mitigation system described herein may analyze the location data provided by one or more DSRC-compliant GPS units (e.g., $s_j(t)$ and $s_E(t)$) determine what lane of the roadway the vehicle is traveling in based on the relative positions of vehicles on the roadway.

Described herein are embodiments of a mitigation system for providing an estimate of whether an obstruction is present in a particular lane of a roadway using wireless vehicle data that is included in a wireless message (e.g., a DSRC message, a BSM, a full-duplex wireless message, etc.).

Example Path History Data

Assume a vehicle is driving in a first lane of a roadway. The vehicle may be a DSRC-equipped vehicle. The vehicle may modify its heading, speed or acceleration, thereby modifying the path of the vehicle. For example, a driver of the vehicle may observe an obstruction present in the first lane of the roadway, and responsive to this observation, the driver may cause the vehicle to (1) slow down to a slower than normal driving speed while traveling in the first lane and before colliding with the obstruction, (2) steer to a second lane of the roadway before colliding with the obstruction and then (3) accelerate again to a normal driving speed to drive past the obstruction while traveling in the second lane. The vehicle may record path history data describing a path history of the vehicle while traveling. The path history may describe, for example, the steps described above for responding to the observation of the obstruction present in the first lane of the roadway.

In some embodiments, the path history data may describe the location of the vehicle at different times. The information necessary for constructing such path history data is already included in BSMs. The mitigation system described herein may makes use of this path history data to discern patterns among individual vehicles or groups of vehicles. The patterns may indicate a presence of a roadway obstruction present in a roadway or a particular lane of a roadway.

For example, a pattern in the path history data received from a group of vehicles may indicate that the group of vehicles may all slow down in a similar fashion whenever they reach the same (or approximately the same) geographic point on a roadway, the same (or approximately the same) geographic point in a particular lane of the roadway or the same set of other vehicles. This pattern may be identified by the mitigation system. The mitigation system may estimate the presence of a traffic jam present in the roadway or a specific lane of the roadway based on the identified pattern.

In some embodiments, the path history data may describe one or more of the following for one or more vehicles: a series of times when a vehicle was traveling; a series of geographic locations where the vehicle was located at the different times (e.g., as indicated by location data sourced from a DSRC-compliant GPS unit); the velocity of the vehicle at the different times; the acceleration of the vehicle at the different times; a bearing or heading of the vehicle at the different times; vehicle kinematic data describing one or more kinematics of the vehicle such vehicle brake status or any other vehicle kinematic data which describes one or more kinematics of the vehicle, and ADAS system engagement information such as whether a vehicle traction control system or any other ADAS system of the vehicle is engaged and a description of the actions taken by the ADAS system.

In some embodiments, the path history data is a component of any other wireless message, such as a DSRC message or a full-duplex wireless message.

In some embodiments, the path history data may be an element of the BSM data described below with reference to FIGS. 5A and 5B. The BSM data may be included in a BSM. The BSM may be transmitted or broadcasted via DSRC.

In some embodiments, one or more of the elements of the BSM data may be included in a DSRC message or a full-duplex wireless message. For example, a DSRC message may include the path history data for a DSRC-equipped vehicle.

Example Deployment

A set of vehicles are considered to be "downstream vehicles" because they are downstream of an ego vehicle which includes a mitigation system as described herein. The vehicle which is immediately in front of (or immediately downstream of) the ego vehicle is referred to as a preceding vehicle. Since this preceding vehicle is downstream of the ego vehicle, it is a special class of downstream vehicle in that it is both a downstream vehicle and directly in front of the ego vehicle. In some embodiments, the mitigation system identifies a traffic obstruction (or a traffic jam) and, responsive to this identification, the mitigation system of the ego vehicle modifies the velocity of the ego vehicle based on the velocity of the preceding vehicle so that the ego vehicle does not collide with the preceding vehicle and instead smoothly decelerates to match or substantially match the velocity of the preceding vehicle. In some embodiments, the mitigation system identifies a traffic obstruction (or a traffic jam) and, responsive to this identification, the mitigation system of the ego vehicle modifies the velocity of the ego vehicle based on (1) the velocity of the set of downstream vehicles (e.g., based on the average velocity of the vehicles in the set or based on the slowest velocity of the vehicles in the set) and (2) the preceding vehicle so that the ego vehicle does not collide with the preceding vehicle or the set of downstream vehicles and instead smoothly decelerates to match or substantially match the velocity of the set of downstream vehicles.

In some embodiments, the mitigation system may work by one or more downstream vehicles (including the preceding vehicle) transmitting wireless messages to one or more of the following devices: an ego vehicle; an RSU; and a cloud server. A wireless message may include BSM data (or digital data describing similar information as the BSM data) for the vehicle which originally transmitted the wireless message. The wireless messages received by the mitigation system may be of various types, including, for example, one or more of the following types of messages: DSRC messages; BSM messages; cellular messages; millimeter wave messages; full-duplex wireless communication messages; and etc.

In some embodiments, a mitigation system of an ego vehicle may receive one or more wireless messages, aggregate the BSM data (or digital data describing similar information as BSM data) included in these wireless messages and estimate a presence of a traffic jam (or one or more slower moving downstream vehicles in a same lane of travel as the ego vehicle) based on the aggregated BSM data (or digital data describing similar information as BSM data). See, for example, message 120A of FIG. 6A which is described in more detail below.

In some embodiments, an RSU may aggregate the BSM data (or digital data describing similar information as BSM data). The RSU may include a mitigation system. The mitigation system of the RSU may provide batches of aggregated BSM data (or digital data describing similar information as BSM data) to an ego vehicle that is within transmission range of the RSU so that the ego vehicle receives a wireless message (e.g., a DSRC message) from the RSU including a batch of aggregated BSM data (or digital data describing similar information as BSM data) collected and aggregated from a plurality of vehicles that are downstream from the ego vehicle. The transmission range may include DSRC range, Wi-Fi range, full-duplex wireless communication range or any other range for a wireless message. See, for example, the first RSU wireless message 121 of FIG. 6A which is described in more detail below.

Optionally, the RSU may transmit the batched BSM data (or digital data describing similar information as BSM data) to a cloud server. The cloud server may then provide a batch of BSM data (or digital data describing similar information as BSM data) to an ego vehicle via a mobile data network that may include third-generation (3G), fourth-generation (4G), long-term evolution (LTE), Voice-over-LTE ("VoLTE") or any other mobile data network or combination of mobile data networks. See, for example, the server wireless message 173 of FIG. 6B which is described in more detail below.

ADAS System

Examples of an ADAS system may include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a vehicle that makes that vehicle be an autonomous vehicle or a semi-autonomous vehicle.

In some embodiments, the engagement or activities of an ADAS system may be included in the path history data which is an element of the BSM data or digital data describing information similar to BSM data.

In some embodiments, the mitigation system executes the following steps: (1) estimate the presence of a traffic jam based on at least one instance of DSRC-based data (i.e., data included in a DSRC message as specified by the DSRC standard) such as BSM data; (2) determine how to modify the acceleration of the ego vehicle so that the ego vehicle travels at a speed that is consistent with the speed of the vehicles included in the traffic jam or consistent with the preceding vehicle which is directly in front of the ego vehicle; (3) provide a signal to the ADAS system that describes how to modify the acceleration of the ego vehicle; and (4) engage the ADAS system so that the ego vehicle modifies its acceleration to achieve a speed that is consistent with the speed of the vehicles included in the traffic jam or consistent with the speed of the preceding vehicle.

In some embodiments, the mitigation system executes the following steps: (1) estimate the presence of a traffic jam based on at least one instance of DSRC-based data (i.e., data included in a DSRC message as specified by the DSRC standard) such as BSM data; (2) determine how to modify the acceleration of the ego vehicle so that the ego vehicle travels at a speed that is consistent with the speed of a set of downstream vehicles included in the traffic jam while avoiding collision with the preceding vehicle traveling directly in front of the ego vehicle; (3) provide a signal to the ADAS system that describes how to modify the acceleration of the ego vehicle; and (4) engage the ADAS system so that the ego vehicle modifies its acceleration to achieve a speed that is consistent with the speed of a set of downstream vehicles included in the traffic jam while avoiding collision with the preceding vehicle traveling directly in front of the ego vehicle.

In this way, the mitigation system modifies the speed and acceleration of the ego vehicle based at least in part on DSRC-based data such as BSM data. The ADAS system may otherwise control the operation of the ego vehicle to respond to the presence of the traffic jam. The response may include one or more of the mitigating actions described above.

Example Overview

Figure 1B:
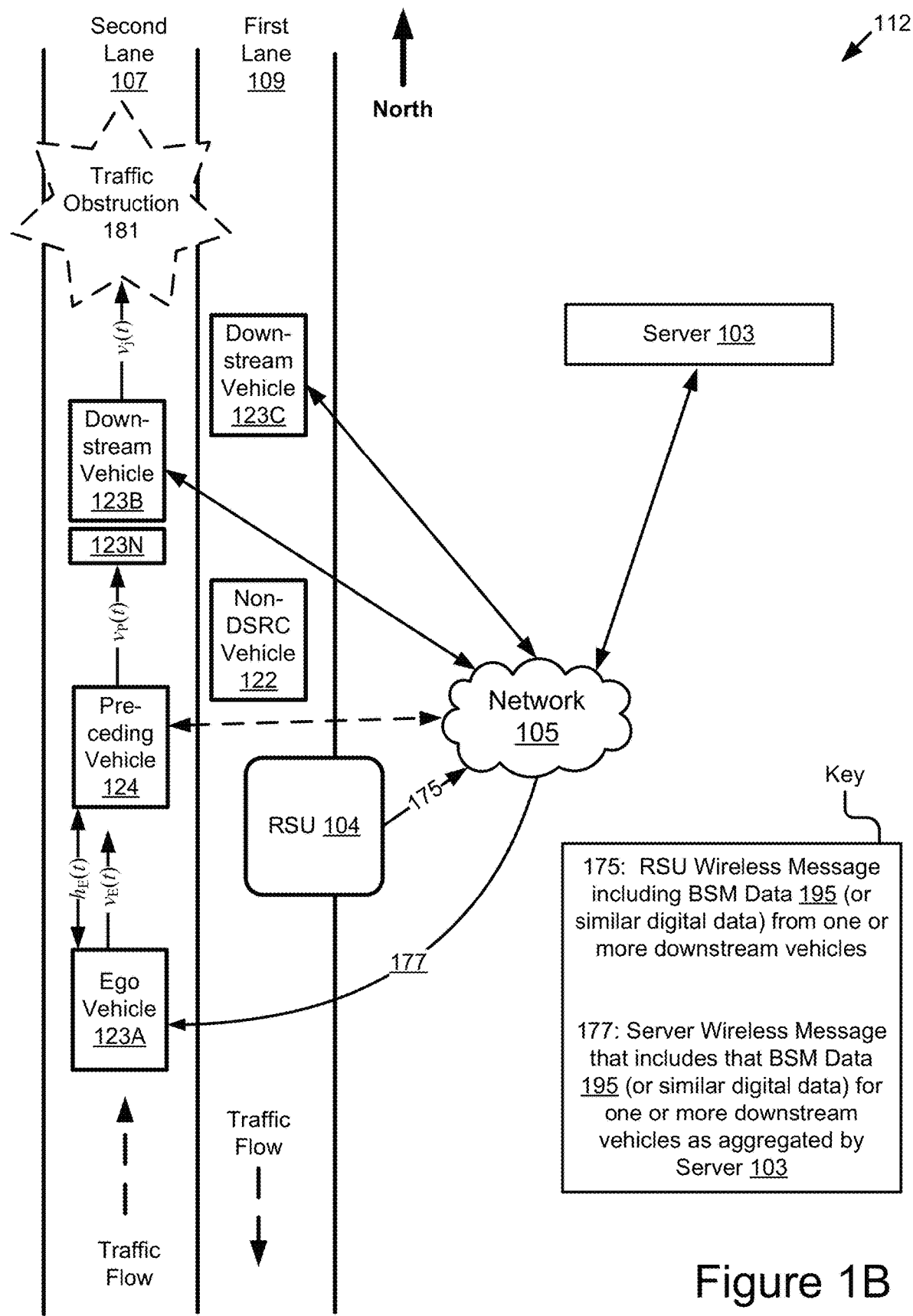
Figure 6A:
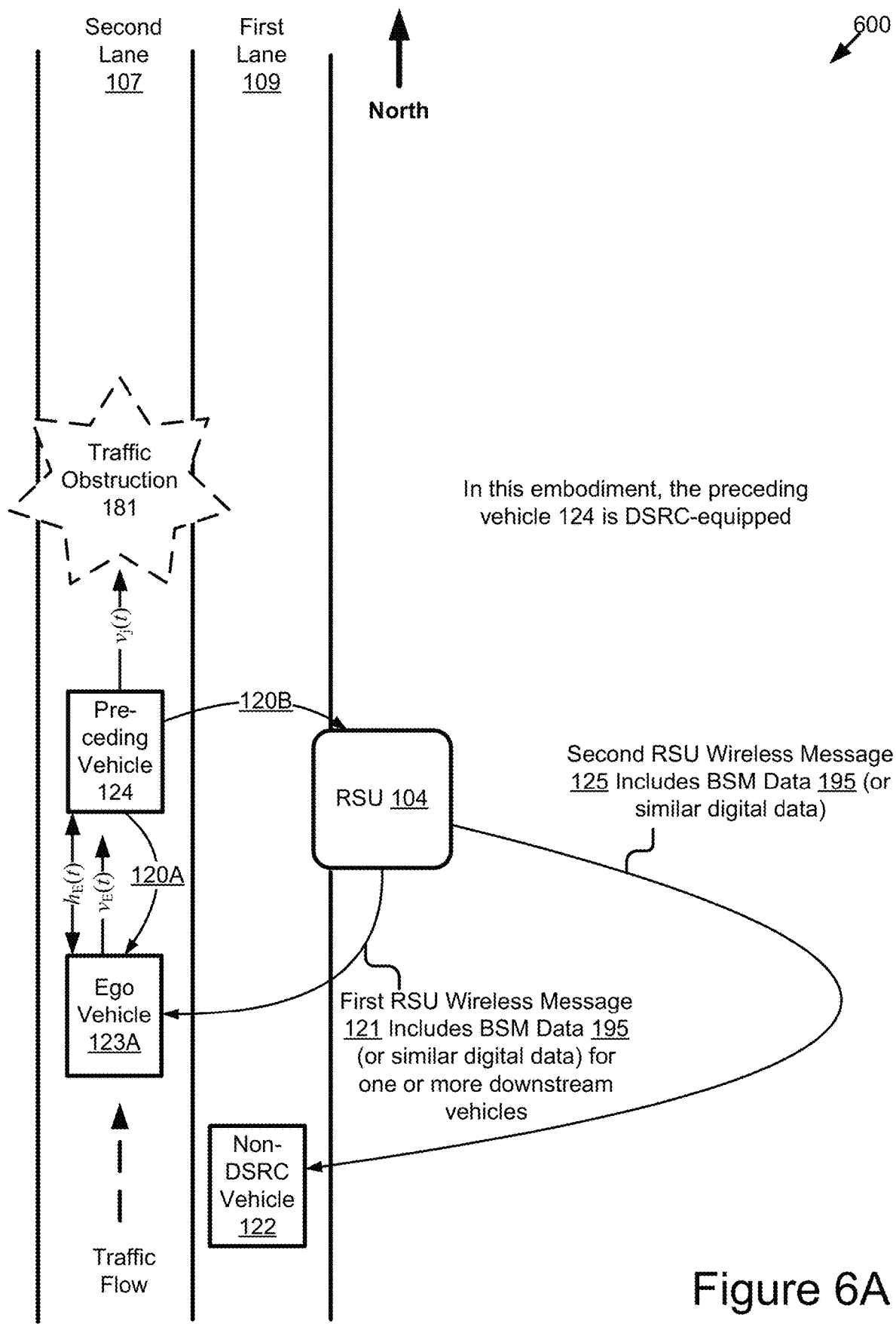
FIGS. 6A and 6B are block diagrams illustrating operating environments for an ego vehicle including a mitigation system according to some embodiments.
Figure 6B:
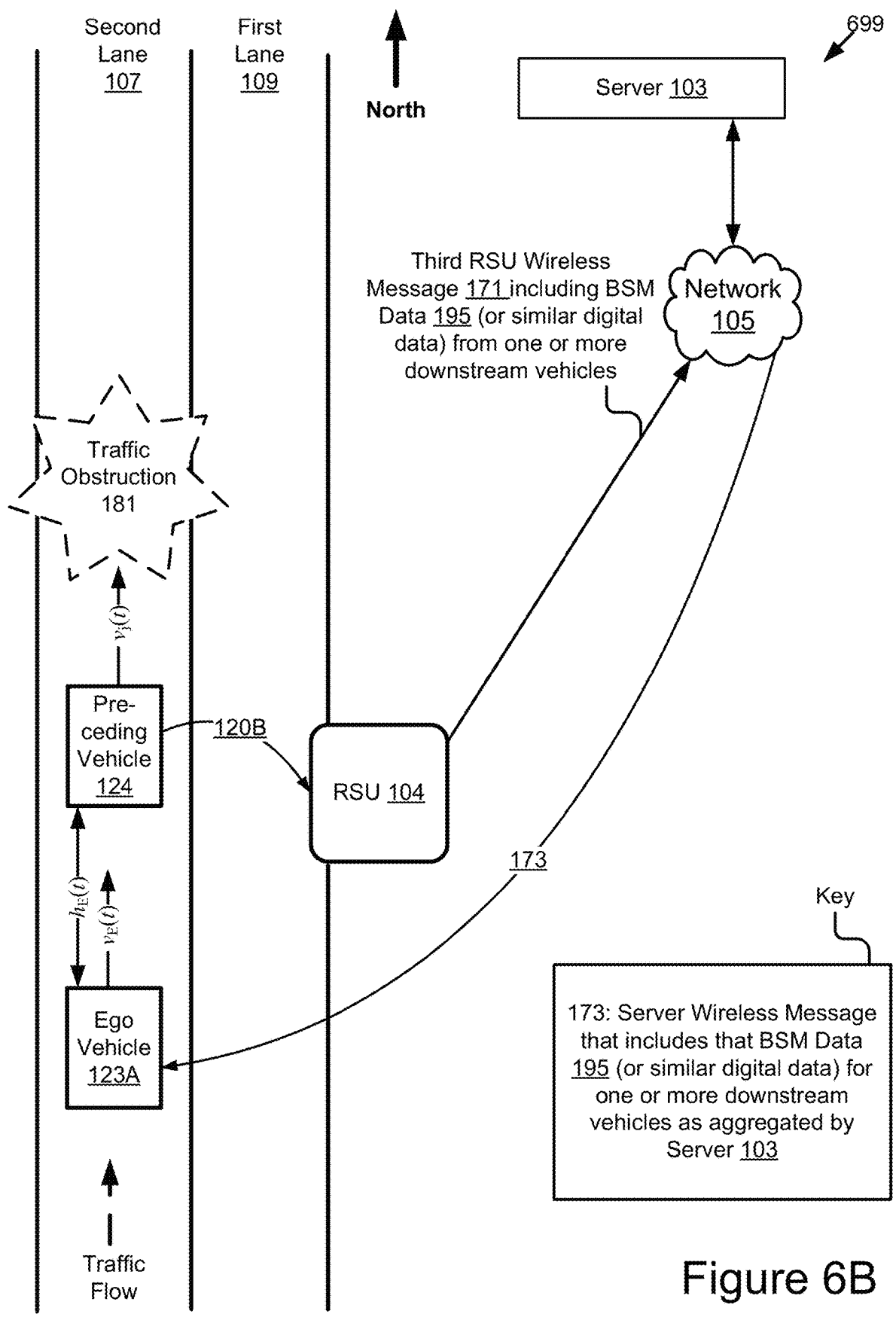

FIGS. 1A, 1B, 1C, 6A and 6B are block diagrams illustrating example operating environments 111, 112, 100, 600, 699 for an ego vehicle 123A including a mitigation system 199 according to some embodiments. These figures are discussed herein in the following order: FIG. 1A; FIG. 6A; FIG. 1B; FIG. 6B; and FIG. 1C Referring now to FIG. 1A, depicted is a block diagram illustrating an example operating environment 111 for an ego vehicle 123A, a preceding vehicle, a downstream vehicle 123B and a non-DSRC vehicle 122. The elements of the operating environment 111 include similar components except for (1) whether they are DSRC-equipped or not and (2) whether they include a mitigation system or not. The ego vehicle 123A and the downstream vehicle 123B are each DSRC-equipped. The preceding vehicle 124 may or may not be DSRC-equipped. The non-DSRC vehicle 122 is not DSRC-equipped.

The ego vehicle 123A includes a mitigation system as described below. The downstream vehicle 123B, preceding vehicle 124 and the non-DSRC vehicle 122 may or may not include a mitigation system.

The elements and functionality of the mitigation system are described in more detail below with reference to FIG. 1C (see, e.g., the mitigation system 199 depicted in FIG. 1C).

The operating environment 111 may include a plurality of downstream vehicles 123B. For example, set 123N represents a set of downstream vehicles 123B. The set 123N includes one or more downstream vehicles 123B. For example, the set 123N includes a plurality of downstream vehicles 123N that separate the preceding vehicle 124 from the downstream vehicle 123B proximate to a traffic obstruction 181.

In some embodiments, the ego vehicle 123A and the downstream vehicle 123B (are of the same make (e.g., Toyota) so that the functionality described herein is only available to DSRC-equipped vehicles of that make. For example, the ego vehicle 123A and the downstream vehicle 123B each include a mitigation system so that the functionality of the mitigation system is provided to each of the ego vehicle 123A and the downstream vehicle 123B.

The operating environment 111 may also include one or more vehicles that are not DSRC-equipped such as the non-DSRC vehicle 122. These non-DSRC vehicles 122 may include a car, bus, semi-truck, drone, or any other conveyance that is configured to operate on a roadway. The non-DSRC vehicle 122 does not include a DSRC module, which is described below with reference to FIG. 1C, or any capability to communicate via DSRC.

The operating environment 111 may include a roadway. The roadway may include a first lane 109 and a second lane 107. In the depicted embodiment, the roadway is configured so that traffic using the second lane 107 travels in a substantially north-bound heading whereas traffic using the first lane 109 travels in a substantially south-bound heading. In other embodiments, the roadway may be configured so that traffic travels in other directions than those depicted in FIG. 1A. The roadway may also include different lanes than those depicted in FIG. 1A. For example, the roadway depicted in FIG. 1A may include a road that is a single lane road or a road that includes more than two lanes.

FIG. 1A is not drawn to scale. In some embodiments, each of the first lane 109 and the second lane 107 are substantially 3 meters wide.

In some embodiments, the roadway includes a traffic obstruction 181. As depicted in FIG. 1A, the traffic obstruction is present in the second lane 107. The traffic obstruction 181 is depicted with a dashed line to indicate that it is an optional feature of the operating environment 111. The traffic obstruction 181 may include any feature of the roadway that impedes or otherwise affects the velocity of the downstream vehicle 123B. For example, the traffic obstruction 181 may include a traffic jam or some other speed impediment to vehicles traveling in the second lane 107.

One or more of the ego vehicle 123A, the preceding vehicle 124 and the downstream vehicle 123B (including those of the set 123N) include one or more onboard sensors.

Figure 1D:
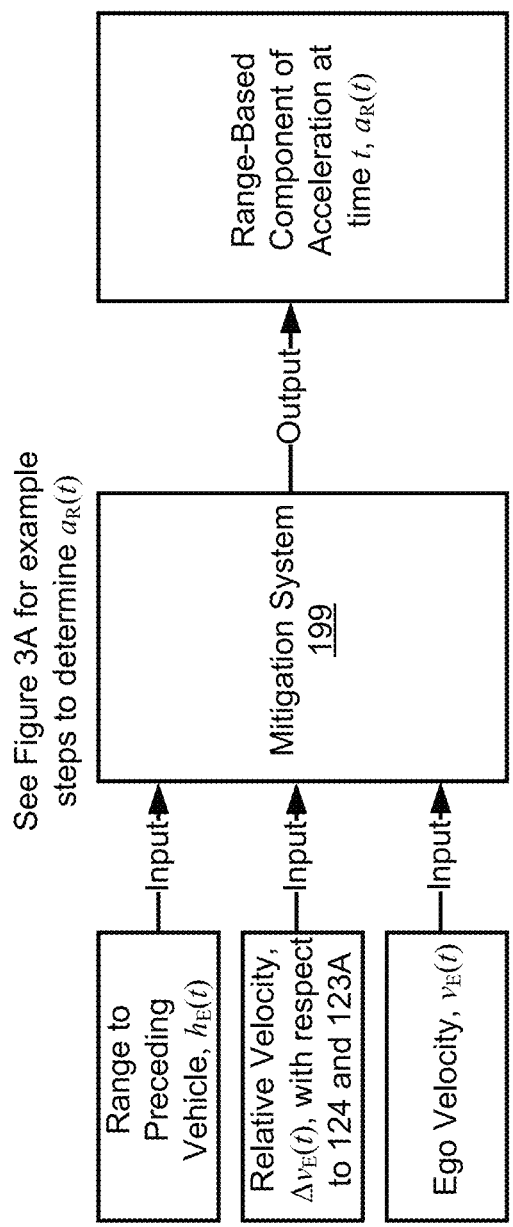
FIGS. 1D through 1F are block diagrams illustrating process flows executed by the mitigation system according to some embodiments.
Figure 1E:
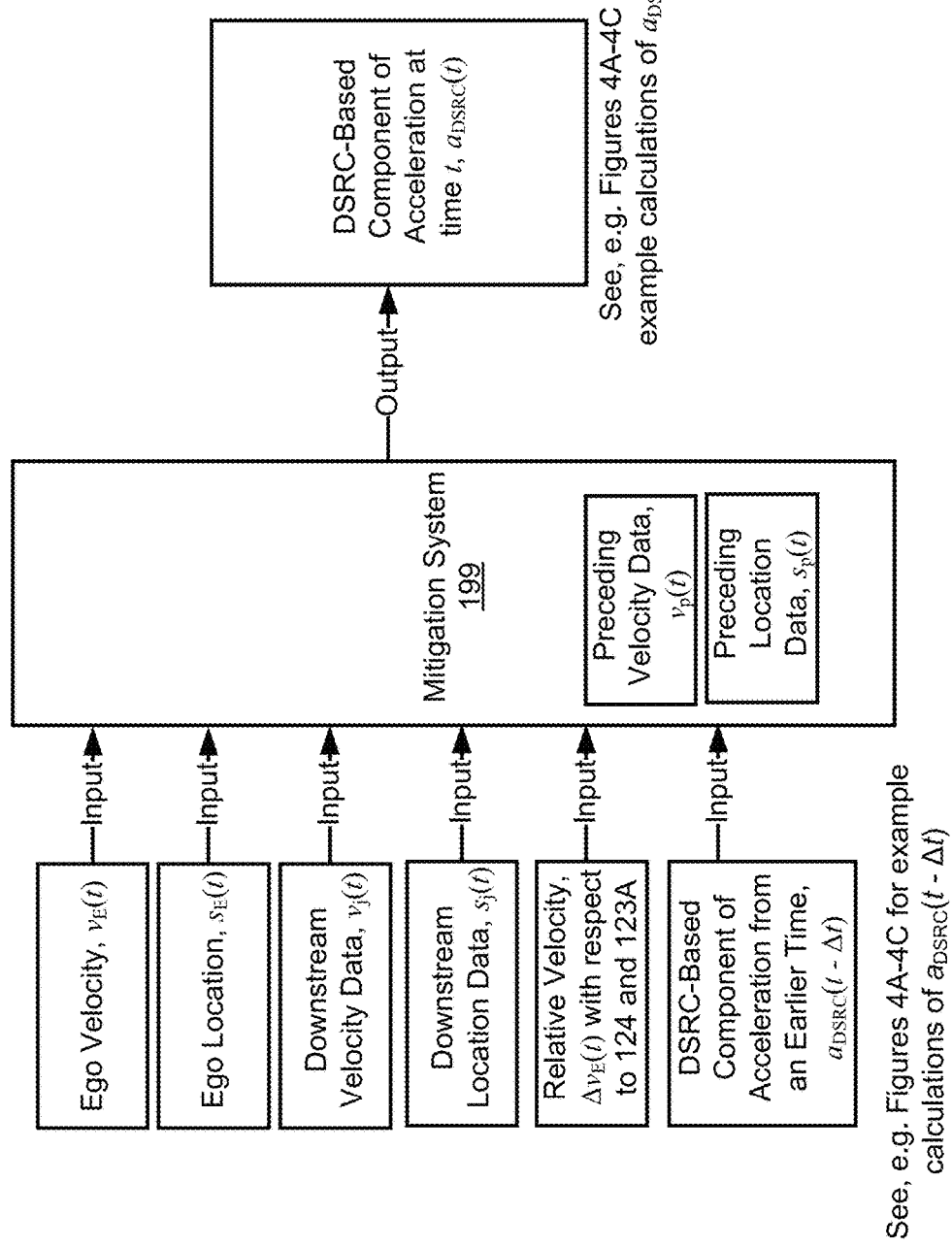

The one or more onboard sensors of the ego vehicle 123A measure, among other parameters, one or more of the following: a range from the ego vehicle 123A to a preceding vehicle 124 ("$h_E(t)$"); a velocity of the preceding vehicle ("$v_P(t)$"), which may be calculated from other measurements of the one or more onboard sensors; a location of the preceding vehicle ("$s_P(t)$," see, e.g., FIG. 1E), which may be calculated from other measurements of the one or more onboard sensors; a velocity of the ego vehicle 123A ("$v_E(t)$" or an "ego velocity"); a location of the ego vehicle ("$s_E(t)$," see, e.g., FIG. 1E); and any other measurements or variables relating to the ego vehicle 123A as described herein.

The one or more onboard sensors of the preceding vehicle 124 may measure, among other parameters, one or more of the following: the velocity of the preceding vehicle 124 ("$v_P(t)$"); the location of the preceding vehicle ("$s_P(t)$"); one or more of the parameters described below with reference to the BSM data (see, e.g., FIGS. 5A and 5B); and any other measurements or variables related to the preceding vehicle 124 as described herein. The one or more onboard sensors of the downstream vehicle 123B measure, among other parameters, one or more of the following: a velocity of the downstream vehicle 123B ("$v_j(t)$" or a "downstream velocity"); a location of the downstream vehicle 123B ("$s_j(t)$," see, e.g., FIG. 1E); one or more of the parameters described below with reference to the BSM data (see, e.g., FIGS. 5A and 5B); and any other measurements or variables related to the downstream vehicle 123B as described herein.

In some embodiments, the sensor data 196 is used by the mitigation system 199 to determine other data which is included in the set of data 198. For example, the mitigation system 199 may include code and routines that are operable, when executed by a processor of the ego vehicle 123A, to cause the processor to determine $v_p(t)$ by determining the sum of $v_E(t)$ and $\Delta v_E(t)$, i.e., $v_p(t)=v_E(t)+\Delta v_E(t)$. Similarly, the mitigation system 199 may include code and routines that are operable, when executed by the processor of the ego vehicle 123A, to cause the processor to determine $s_p(t)$ by determining the sum of $s_E(t)$ and $h_E(t)$, i.e., $s_p(t)=s_E(t)+h_E(t)$.

The one or more onboard sensors are described according to some embodiments below with reference to the sensor set 182. For example, the sensors of the sensor set 182 are examples of onboard sensors which may be included in the ego vehicle 123A, the preceding vehicle 124 and the downstream vehicle 123B, where each of these vehicles may include different combinations of onboard sensors.

In some embodiments, the traffic obstruction 181 is a traffic jam. One or more of the downstream vehicle 123B and the preceding vehicle 124 may be an element of the traffic jam or about to enter the traffic jam such that the velocity of one or more of the downstream vehicle 123B, $v_E(t)$, and the preceding vehicle 124, $v_p(t)$, is less than the velocity of the ego vehicle 123A, $v_E(t)$, at a specific time, t, which is depicted in FIG. 1A. In some embodiments, the mitigation system of the ego vehicle 123A may take actions using BSM data 195 describing one or more of the downstream vehicle 123B and the preceding vehicle 124 to identify the traffic obstruction 181 and modify the velocity of the ego vehicle 123A to be consistent with the velocity of one or more of the preceding vehicle 124 and the downstream vehicles 123B, 123N. For example, the mitigation system modifies the velocity of the ego vehicle 123A to match or substantially match the velocity of the preceding vehicle 124. In another example, the mitigation system modifies the velocity of the ego vehicle 123A to match or substantially match the average velocity of the downstream vehicles 123B, 123N.

For example, one or more of the ego vehicle 123A, the preceding vehicle 124 and the downstream vehicle 123B are communicatively coupled to a network 105. The network 105 is described in more detail below with reference to FIG. 1C. The preceding vehicle 124 is depicted in FIG. 1A as being communicatively coupled to the network 105 by a dashed line to indicate that this is an optional feature and the preceding vehicle 124 may or may not be communicatively coupled to the network 105. For example, the preceding vehicle 124 may or may not be DSRC-enabled and the preceding vehicle 124 may or may not be a connected vehicle. The ego vehicle 123A may receive wireless vehicle data from the network 105. The wireless vehicle data may be DSRC-based data such as BSM data.

In some embodiments, the mitigation system of the ego vehicle 123A may analyze this BSM data, identify the presence of the traffic obstruction based on the BSM data, determine the relative velocity ("$\Delta v_E(t)$") between the ego vehicle 123A and the preceding vehicle 124 (where $\Delta v_E(t) = v_P(t) - v_E(t)$), and modify the velocity of the ego vehicle 123A to match or substantially match the velocity of the preceding vehicle 124 such that the velocity of the ego vehicle 123A is consistent with the preceding vehicle 124 or one or more other downstream vehicles 123B. In this way the ego vehicle 123A does not collide with the preceding vehicle 124 and modifies its velocity to be consistent with one or more downstream vehicles 123B such as the preceding vehicle 124.

In some embodiments, the mitigation system of the ego vehicle 123A may analyze this BSM data, identify the presence of the traffic obstruction based on the BSM data, determine the relative velocity ("$\Delta v_E(t)$") between the ego vehicle 123A and the preceding vehicle 124 (where $\Delta v_E(t) = v_P(t) - v_E(t)$), and modify the velocity of the ego vehicle 123A to match or substantially match the velocity of the downstream vehicles 123B, 123N (which may include the preceding vehicle 124) such that the velocity of the ego vehicle 123A is consistent with the velocity of the downstream vehicles. In these embodiments the velocity of the ego vehicle 123A is modified in this way when at least one of the downstream vehicles 123B, 123N is traveling slower or substantially slower than the preceding vehicle 124. In this way the ego vehicle 123A does not collide with the preceding vehicle 124 and modifies its velocity to be consistent with one or more downstream vehicles 123B such as the preceding vehicle 124.

In some embodiments, if the preceding vehicle 124 is not DSRC-enabled, then the mitigation system of the ego vehicle 123A determines the velocity of the preceding vehicle 124 using the one or more onboard sensors of the ego vehicle 123A to measure the velocity of the preceding vehicle 124. If the preceding vehicle 124 is DSRC-enabled, then the velocity of the preceding vehicle 124 is included in the BSM data transmitted by the preceding vehicle 124.

Referring now to FIG. 1B, depicted is a block diagram illustrating an example operating environment 112 in which the network 105 is communicatively coupled to a server 103.

The server 103 includes a processor-based computing device that is operable as a hardware server.

For example, the server 103 may be communicatively coupled to the network 105 to receive wireless vehicle data from the network 105 (e.g., as transmitted by one or more connected vehicles traveling in the second lane 107 or the first lane 109), aggregate this wireless vehicle data and provide this aggregated wireless vehicle data to the ego vehicle 123A so that the mitigation system of the ego vehicle 123A can provide its functionality.

Element 123C includes a downstream vehicle traveling in a lane which is different from the lane traveled in by the ego vehicle 123A.

Element 175 includes an RSU wireless message including BSM data 195 (or similar digital data) from one or more downstream vehicles 123B, 123N, 123C.

Element 177 includes a server wireless message that includes the BSM data 195 (or similar digital data) from the one or more downstream vehicles 123B, 123N, 123C. Here the BSM data 195 included in element 177 is aggregated by the server 103 upon receipt from the network 105 via one or more RSU wireless messages such as described above for element 175.

An example implementation of the embodiment depicted in FIG. 1B is described below with reference to FIG. 6B.

The server 103 of the operating environment 112 is described in more detail below with reference to FIG. 1C.

FIGS. 6A and 6B will now be described for the purpose of providing example implementations of the mitigation system. FIGS. 6A and 6B depict example embodiments where the preceding vehicle is DSRC-enabled.

Referring to FIG. 6A, depicted is an operating environment 600 for the ego vehicle 123A including a mitigation system as described herein. The operating environment 600 includes elements similar to those described above with reference to FIG. 1A, and so, the description of these elements will not be repeated here.

As depicted in FIG. 6A, the preceding vehicle 124 is a DSRC-equipped vehicle. However, as described above with reference to FIG. 1A, in some embodiments the preceding vehicle 124 is not DSRC-equipped.

FIG. 6B is not drawn to scale. In some embodiments, each of the first lane 109 and the second lane 107 are substantially 3 meters wide.

In some embodiments, the preceding vehicle 124 transmits a first wireless message 120A to the ego vehicle 123A. The first wireless message 120A includes BSM data 195 describing the preceding vehicle 124 (or digital data that describes information similar to the information described by BSM data, herein "similar digital data"). For example, the first wireless message 120A includes BSM data 195 that describes, among other things, a velocity of the preceding vehicle 124, a location of the preceding vehicle 124 with lane-level accuracy and vehicle kinematic data for the preceding vehicle 124 (see, e.g., the vehicle motion data described below with reference to FIG. 5B, which describes a plurality of example kinematics). The ego vehicle 123A receives the first wireless message 120A from the preceding vehicle 124. The mitigation system of the ego vehicle 123A analyzes the BSM data 195 to determine how to modify the acceleration of the ego vehicle 123A so that the velocity of the ego vehicle 123A matches, substantially matches or is otherwise consistent with the velocity of the preceding vehicle 124 at a later time (e.g., t+1 or t+N, where "N" is a positive number and "t" is time) when the ego vehicle 123A is closer to the preceding vehicle 124.

In some embodiments, the RSU 104 aggregates BSM data 195 (or similar digital data) from one or more downstream vehicles 123B (such as, and optionally including, the preceding vehicle 124) and then relays this aggregated data to the ego vehicle 123A and optionally a non-DSRC vehicle 122 (which is a connected vehicle that is not DSRC equipped). For example, the preceding vehicle 124 transmits a second wireless message 120B to the RSU 104 which includes BSM data 195. The second wireless message 120B may include any type of wireless message. The RSU 104 transmits a first RSU wireless message 121 to the ego vehicle 123A that includes a batch of BSM data 195 which the RSU 104 has aggregated from one or more downstream vehicles 123B (such as, and optionally including, the preceding vehicle 124). The first RSU wireless message 121 may include any type of wireless message. The mitigation system of the ego vehicle 123A analyzes the BSM data 195 included in the first RSU wireless message 121 to determine how to modify the acceleration of the ego vehicle 123A so that the velocity of the ego vehicle 123A matches, substantially matches or is otherwise consistent with the velocity of the preceding vehicle 124 at a later time (e.g., t+1 or t+N, where "N" is a positive number and "t" is time) when the ego vehicle 123A is closer to the preceding vehicle 124.

In another example, the RSU 104 transmits a second RSU wireless message 125 to the non-DSRC vehicle 122 that includes a batch of BSM data 195 (or similar digital data) which the RSU 104 has aggregated from one or more downstream vehicles 123B (such as, and optionally including, the preceding vehicle 124). Although FIG. 6A does not depict any downstream vehicles 123B, it is to be understood that the preceding vehicle 124 is an example of a downstream vehicle 123B and that the roadway may include other downstream vehicles 123B. The second RSU wireless message 125 may include any type of wireless message. The mitigation system of the ego vehicle 123A analyzes the BSM data 195 included in the second RSU wireless message 125 to determine how to modify the acceleration of the ego vehicle 123A so that the velocity of the ego vehicle 123A matches, substantially matches or is otherwise consistent with the velocity of the preceding vehicle 124 at a later time (e.g., t+1 or t+N, where "N" is a positive number and "t" is time) when the ego vehicle 123A is closer to the preceding vehicle 124.

Embodiments that may include the operating environment 111 beneficially require no servers such as the server 103 included in the embodiment depicted in FIGS. 1B and 6B, or the expense and delay associated with the same. These embodiments may also require no new standardization since they may utilize any BSM data 195 from any DSRC-equipped vehicle such as the preceding vehicle 124 and the ego vehicle 123A.

Elements of the operating environment 600 are described in more detail below with reference to FIG. 1C.

Referring now to FIG. 6B, depicted is a block diagram illustrating an example operating environment 600 including: a preceding vehicle 124; an ego vehicle 123A; an RSU 104; a roadway including a first lane 109 and a second lane 107; an optional traffic obstruction in the second lane 107 of the roadway; a server 103; and a network 105. The preceding vehicle 124 transmits a second wireless message 120B to the RSU 104.

These elements of the operating environment 112 were described above with reference to FIGS. 1A, 1B and 6A, and so, their descriptions will not be repeated here: a preceding vehicle 124; an ego vehicle 123A; an RSU 104; a roadway including a first lane 109 and a second lane 107; an optional traffic obstruction in the second lane 107 of the roadway; and a second wireless message 120B.

FIG. 6B is not drawn to scale. In some embodiments, each of the first lane 109 and the second lane 107 are substantially 3 meters wide.

The network 105 and the server 103 are described in more detail below with reference to FIG. 1C.

In FIG. 1B, the preceding vehicle 124 does not transmit the second wireless message 120B directly to the ego vehicle 123A. Instead, this second wireless message 120B is transmitted to the RSU 104. The RSU 104 may transmit a third RSU wireless message 171 to the network 105. The third RSU wireless message 171 may include the aggregated BSM data 195 (or similar digital data) from one or more downstream vehicles 123B (such as, and optionally including, the preceding vehicle 124). The server 103 may receive the third RSU wireless message 171 from the network 105.

The server 103 may transmit, via the network 105, a server wireless message 173 that includes the BSM data 195 (or similar digital data) which is aggregated by the server 103 from one or more RSUs 104. The server wireless message 173 is any type of wireless message. For example, the ego vehicle 123A receives the server wireless message 173 via a cellular data connect such as 3G, 4G, 5G, LTE or any derivative thereof. The mitigation system of the ego vehicle 123A analyzes the BSM data 195 included in the server wireless message 173 to determine how to modify the acceleration of the ego vehicle 123A so that the velocity of the ego vehicle 123A matches, substantially matches or is otherwise consistent with the velocity of the preceding vehicle 124 at a later time (e.g., t+1 or t+N, where "N" is a positive number and "t" is time) when the ego vehicle 123A is closer to the preceding vehicle 124.

The key shown in the bottom right-hand corner of FIG. 1B includes a description of example embodiments of the server wireless message 173. These examples are not intended to be limiting.

Referring to FIG. 1C, the operating environment 100 may include one or more of the following elements: the ego vehicle 123A; one or more downstream vehicles 123B, 123C, 123N (which may be referred to collectively or individually as "downstream vehicle 123B"); the preceding vehicle 124; the roadside unit 104 ("RSU 104"); and the server 103. These elements of the operating environment 100 may be communicatively coupled to the network 105.

FIG. 1C is described below with reference to BSM data 195. The BSM data 195 is stored in the downstream vehicle 123B and describes the downstream vehicle 123B. For example, the BSM data 195 includes a digital data set 193 that describes one or more of the following: the velocity of the preceding vehicle 124; the location of the preceding vehicle 124 (optionally with lane-level accuracy); vehicle kinematic data relating to the operation of the preceding vehicle 124; the velocity of the downstream vehicle 123B; the location of the downstream vehicle 123B (optionally with lane-level accuracy); and vehicle kinematic data relating to the operation of the downstream vehicle 123B. In some embodiments, the preceding vehicle 124 is not DSRC-enabled, and so, the BSM data 195 may not include information describing the preceding vehicle in such embodiments and this information is instead determined by the mitigation system 199 based on measurements of one or more onboard sensors of the sensor set 182 as described by the sensor data 196.

The BSM data 195 is transmitted to one or more of the following elements of the operating environment 100 via the network: the preceding vehicle 124; the downstream vehicle 123B; the RSU 104; the server 103; and the ego vehicle 123A. The BSM data 195 is used in FIG. 1C for the purpose of illustration. In some embodiments, the BSM data 195 is replaced in FIG. 1C with digital data that includes digital data set 193.

In some embodiments, the server 103 may be an element of the RSU 104. In some embodiments, the server 103 may be a separate element. For example, the server 103 may be a server or some other processor-based computing device that is operable to send and receive messages via the network 105. The RSU 104 and the server 103 are described in more detail below.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, VoLTE or any other mobile data network or combination of mobile data networks. Further, the network 105 may include one or more IEEE 802.11 wireless networks.

In some embodiments, the network 105 may include one or more communication channels shared among the wireless communication devices included in the operating environment 100 (e.g., the downstream vehicle 123B, the preceding vehicle 124, the ego vehicle 123A, the RSU and the server 103.). The communication channel may include a DSRC channel, full-duplex wireless communication channel or a channel compliant with any other wireless communication protocol. For example, the network 105 may be used to transmit a DSRC message, DSRC probe or BSM to a DSRC-equipped device such as one or more of the RSU 104, downstream vehicle 123B, the preceding vehicle 124 and the ego vehicle 123A.

One or more of the ego vehicle 123A, the downstream vehicle 123B and the preceding vehicle 124 may include the same or similar elements. The ego vehicle 123A and the downstream vehicle 123B may be referred to collectively as "the DSRC-equipped vehicles 123" or individually as "the DSRC-equipped vehicle 123."

The ego vehicle 123A may include a car, a truck, a sports utility vehicle, a bus, a semi-truck, a drone or any other roadway-based conveyance. In some embodiments, the ego vehicle 123A may be an autonomous vehicle or a semi-autonomous vehicle. For example, the ego vehicle 123A may include an ADAS system. The ADAS system may include any hardware or software necessary to modify the acceleration of the ego vehicle 123. For example, the ADAS system may include the systems that cause the ego vehicle 123A to be an autonomous or semi-autonomous vehicle. The ADAS system is described in more detail below with reference to FIG. 2.

The ego vehicle 123A may include one or more of the following elements: a mitigation system 199; a notification device 184; a DSRC-compliant GPS unit 170; a DSRC module 190; a sensor set 182; and a memory 127 that stores acceleration data 197, sensor data 196, BSM data 195 and prioritized mitigation action plan data 133.

Although not pictured in FIG. 1C, in some embodiments the ego vehicle 123A may include an onboard vehicle computer system that is communicatively coupled to the mitigation system 199, the memory 127, the notification device 184, the DSRC-compliant GPS unit 170, the sensor set 182 and the DSRC module 190. The onboard vehicle computer system may be operable to cause or control the operation of the mitigation system 199. The onboard vehicle computer system may be operable to access and execute the data stored on the memory 127. For example, the onboard vehicle computer system may be operable to access and execute one or more of the elements that are communicative coupled to the onboard vehicle computer system.

In some embodiments, the mitigation system 199 may be an element of one or more of the following devices: the downstream vehicle 123B; the preceding vehicle 124; the RSU 104; the server 103; and the ego vehicle 123A.

In some embodiments, the mitigation system 199 may include code or routines that build a wireless message that includes any data that is needed for another DSRC-equipped vehicle (e.g., the ego vehicle 123A if the mitigation system 199 is an element of the downstream vehicle 123B) to take a mitigating action responsive to the presence of an obstruction on the roadway (or a specific lane of the roadway) or a decreased speed of the vehicle which includes the mitigation system 199.

For example, the mitigation system 199 may include code and routines that are operable to build a wireless message that includes the BSM data 195 or similar digital data. The wireless message may include a DSRC message, a DSRC probe, a BSM or a full-duplex wireless message. In some embodiments, the mitigation system 199 may transmit one or more of the wireless messages described above with reference to FIGS. 1A and 1B. In some embodiments, the mitigation system 199 may transmit the wireless message to the network 105. One or more of other devices of the operation environment 100 may receive the wireless message from the network 105. In this way, the mitigation system 199 may beneficially provide one or more other devices with BSM data 195 of digital data that is similar to BSM data 195.

The mitigation system 199 receives a BSM or DSRC message from the network 105 and parses the BSM data 195 (or similar digital data) from the BSM or the DSRC message. The mitigation system 199 also causes the sensor set 182 to record the sensor data 196. In some embodiments, the mitigation system 199 beneficially determines the presence of one or more downstream vehicles 123B in the roadway (or a specific lane of the roadway) that are traveling with less velocity than the ego vehicle 123A based at least in part on the BSM data 195 that describes the one or more downstream vehicles 123B or the preceding vehicle 124 (e.g., one or more physical properties associated with the one or more downstream vehicles 123B or the preceding vehicle 124) and the sensor data 196 that describes the ego vehicle 123A (e.g., one or more physical properties associated with the ego vehicle 123A and optionally associated with the relationship of the ego vehicle 123A to the preceding vehicle 124).

In some embodiments, the memory 127 stores a threshold velocity which indicates that the one or more downstream vehicles 123B (which may include the preceding vehicle 124) are an element of a traffic jam. For example, if the mitigation system 199 determines, based on the BSM data 195, that the velocity of the one or more downstream vehicles 123B is 10 miles per hour or less for more than a certain period of time, then the mitigation system 199 determines that the one or more downstream vehicles 123B are stuck in a traffic jam at a specific time, t, which indicated by the BSM data 195 (e.g., a velocity at the time t, a location at the time t, and the vehicle kinematic data at the time t).

In some embodiments, the mitigation system 199 may be implemented using hardware including a field-programmable gate array ("FPGA") or an application-specific integrated circuit ("ASIC"). In some other embodiments, the mitigation system 199 may be implemented using a combination of hardware and software. The mitigation system 199 may be stored in a combination of the devices (e.g., servers or other devices), or in one of the devices.

The functionality of the mitigation system 199 is described in more detail below with reference to FIGS. 1D-1F, 2, 3A, 3B and 4A-4C.

The notification device 184 includes a device operable to provide a visual, auditory or audio-visual notification to a driver of the ego vehicles 123. In some embodiments, the notification device 184 includes one or more of an infotainment system, an electronic display, a HUD, a 3D-HUD and a speaker system. The mitigation system 199 causes the notification device 184 to provide notifications to the driver of the ego vehicle 123A.

The DSRC-compliant GPS unit 170 may include hardware that wirelessly communicates with a GPS satellite to retrieve location data that describes a location of the ego vehicle 123A. In some embodiments, a DSRC-compliant GPS unit 170 is operable to provide location data that describes the location of the ego vehicle 123A to a lane-level degree of precision.

For example, the DSRC standard requires that location data be precise enough to infer if two vehicles (such as ego vehicle 123A and another vehicle on the same roadway such as downstream vehicle 123B) are in the same lane of the roadway. The DSRC-compliant GPS unit 170 is operable to identify, monitor and track its two-dimensional position within 1.5 meters of its actual position 68% of the time under an open sky. Since lanes of a roadway are typically no less than 3 meters wide, whenever the two dimensional error of the location data is less than 1.5 meters the mitigation system 199 may analyze the location data provided by the DSRC-compliant GPS unit 170 and determine what lane of the roadway the ego vehicle 123A is traveling in based on the relative positions of vehicles on the roadway.

For example, referring now to FIG. 6B, the mitigation system 199 may analyze the location data generated by the DSRC-compliant GPS unit 170 included in the preceding vehicle 124 and determine that the preceding vehicle 124 is traveling in the second lane 107 based on the location data for the preceding vehicle 124. In some embodiments, this analysis by the mitigation system 199 may include comparing the location of the preceding vehicle 124 as described by the location data provided by the preceding vehicle 124 (which may be an element of the BSM data 195 for the preceding vehicle 124) relative to the location data for the ego vehicle 123A (which may be an element of the sensor data 196). In this way the DSRC-compliant GPS unit 170 may beneficially enable the mitigation system 199 to determine which lanes different DSRC-equipped vehicles are traveling in.

By comparison, a GPS unit which is not compliant with the DSRC standard is far less accurate than the DSRC-compliant GPS unit 170 and not capable of reliably providing lane-level accuracy, as is the DSRC-compliant GPS unit 170. For example, a non-DSRC-compliant GPS unit may have an accuracy on the order of 10 meters, which is not sufficiently precise to provide the lane-level degree of precision provided by the DSRC-compliant GPS unit 170. For example, since a lane may be as narrow as 3 meters wide, the DSRC standard may require a DSRC-compliant GPS unit 170 to have an accuracy on the order of 1.5 meters, which is significantly more precise than a non-DSRC-compliant GPS unit as described above. As a result, a non-DSRC-compliant GPS unit may not be able to provide location data that is accurate enough for the mitigation system 199 to provide its functionality. The imprecision of a non-DSRC-compliant GPS unit may therefore render the functionality of the mitigation system 199 inoperable.

Referring now to FIG. 1C, in some embodiments the location data retrieved by the DSRC-compliant GPS unit 170 may be an element of the sensor data 196 as the ego location data, $s_E(t)$.

The mitigation system 199 may include code and routines that are operable to generate the sensor data 196. For example, the ego vehicle 123A includes a sensor set 182. The sensor set 182 includes one or more sensors. The sensor set 182 collects or records the sensor data 196.

The sensor data 196 includes a set of data 198. The set of data 198 includes digital data that describes one or more of the following: a velocity of the ego vehicle 123A; a location of the ego vehicle (optionally with lane-level accuracy); kinematic data for the ego vehicle 123A; the relative velocity between the ego vehicle 123A and the preceding vehicle 124 (which is equal to the delta of the velocity of the ego vehicle 123A and the velocity of the preceding vehicle 124, which may be determined by measurements of the sensor set 182 if the preceding vehicle is not DSRC-equipped or described by the BSM data 195 if the preceding vehicle 124 is DSRC-equipped); the range or distance separating the ego vehicle 123A from the downstream vehicle 123B (e.g., as determined by a range finder sensor of the sensor set 182); optionally, the velocity of the preceding vehicle 124; and optionally, the location of the preceding vehicle 124. The velocity of the preceding vehicle 124 and the location of the preceding vehicle 124 are included in the BSM data 195 if the preceding vehicle 124 is DSRC-equipped.

In some embodiments, the sensor data 196 includes digital data that describes, for example, one or more of the following: a series of times when the ego vehicle 123A is traveling; a series of geographic locations where the ego vehicle 123A was located at the different times (e.g., as indicated by location data sourced from a DSRC-compliant GPS unit 170); the velocity of the ego vehicle 123A at the different times; the acceleration of the ego vehicle 123A at the different times; a bearing or heading of the ego vehicle 123A at the different times; vehicle kinematic data such the brake status of the ego vehicle 123A or any other vehicle kinematic data which is recordable by the ego vehicle 123A; and ADAS system engagement information such as whether a vehicle traction control system or any other ADAS system of the ego vehicle 123A is engaged and a description of the actions taken by the ADAS system. In this way, the sensor data 196 describes the behavior of the ego vehicle 123A at the different times and at different locations.

The sensor set 182 may include one or more sensors that are operable to measure the physical environment outside of the ego vehicle 123A. For example, the sensor set 182 may record one or more physical characteristics of the physical environment that is proximate to the ego vehicle 123A (which may include the preceding vehicle 124).

In some embodiments, the sensor set 182 may include one or more of the following vehicle sensors: a camera; a RADAR sensor (which is an example of a range finder sensor); a LIDAR sensor (which is an example of a range finder sensor); a laser altimeter (which is an example of a range finder sensor); a navigation sensor (e.g., a global positioning system sensor of the DSRC-compliant GPS unit 170); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 182 includes any hardware or software necessary to determine a range between two objects using Wi-Fi triangulation, which is another example of a range finder sensor.

The sensor set 182 includes any hardware or software necessary to comprise a range finder sensor that is operable to determine the range between two objects such as the ego vehicle 123A and the preceding vehicle 124.

The sensor set 182 includes any hardware or software necessary to comprise a sensor for determining a velocity of a preceding vehicle 124.

The DSRC module 190 may include a DSRC antenna. The DSRC antenna may include a DSRC transceiver and a DSRC receiver. The DSRC module 190 may be configured to broadcast a BSM at some fixed interval (every 10 to 15 seconds) that is user configurable.

In some embodiments, the DSRC module 190 is an element of a communication unit 245 that is described in more detail below with reference to FIG. 2.

The BSM data 195 may include any data that is included or encoded in a BSM. The BSM data 195 is described in more detail below with reference to FIGS. 5A and 5B.

Although not depicted in FIG. 1C, in some embodiments the ego vehicle 123A may include a full-duplex coordination system as described in U.S. patent application Ser. No. 14/471,387 filed on Aug. 28, 2014 and entitled "Full-Duplex Coordination System."

In some embodiments, the full-duplex coordination system of the ego vehicle 123A may receive a full-duplex wireless message that includes data similar to the BSM data 195. The ego vehicle 123A may be communicatively coupled to the network 105.

The acceleration data 197 may include digital data that describes a modification for the acceleration of the ego vehicle 123A which is determined by the mitigation system 199. The acceleration data 197 is configured to cause the ego vehicle 123A to travel at a velocity consistent with one or more of the set of downstream vehicles 123B and the preceding vehicle 124.

The server 103 may include a processor based computing device. For example, the computing device may include a standalone hardware server. In some embodiments, the server 103 may be communicatively coupled to the network 105. The server 103 may include network communication capabilities. The server 103 may be operable to send and receive wireless messages via the network 105. For example, the computing device may include a communication unit (such as described below with reference to the communication unit 245 of FIG. 2). The computing device may be operable to send and receive DSRC messages, BSM, full-duplex wireless messages or any other wireless message.

The server 103 may include a mitigation system 199. The server 103 may receive wireless message including BSM data (or similar digital data) form the network 105. The server 103 may generate the aggregated BSM data 131 based on the BSM data (or similar digital data) included in these wireless messages.

The aggregated BSM data 131 may include one or more sets of BSM data 195 for one or more vehicles (e.g., one or more downstream vehicles 123B which may include the preceding vehicle 124).

The mitigation system 199 of the server 103 may include code and routines that are operable to receive the wireless messages, generate the aggregated BSM data 131 and transmit BSM data 195 to the ego vehicle 123A (and optionally a non-DSRC vehicle 122 as depicted in FIG. 1A) via the network 105

The RSU 104 may include a relay module 106. The RSU 104 may include a communication unit such as communication unit 245 described below with reference to FIG. 2. The RSU 104 may receive wireless messages from one or more downstream vehicles 123B that include BSM data 195. The relay module 106 may include code and routines that are operable to receive BSM data 195 from one or more downstream vehicles 123B, generate aggregated BSM data 131 and then relay this information to the server 103 or the ego vehicle 123A via the network 105. In this way, the RSU 104 may assist the server 103 or the ego vehicle 123A to acquire BSM data 195 for one or more downstream vehicles 123B as described above with reference to FIGS. 1A and 1B.

In some embodiments, the downstream vehicle 123B may include elements that are similar to the ego vehicle 123A, and so, those descriptions will not be repeated here.

In some embodiments, the operating environment 100 may include a plurality of DSRC-equipped vehicles such as the ego vehicle 123A and the downstream vehicle 123B that each include a mitigation system 199 and other elements that are similar to those described above for the ego vehicle 123A or the server 103.

Referring now to FIG. 1D, depicted is a block diagram illustrating a process flow 161 executed by the mitigation system 199 according to some embodiments.

As depicted, the mitigation system 199 receives inputs and determines an output based on these inputs. For example, the mitigation system 199 receives as inputs: (1) $h_E(t)$, which includes digital data that describes a range from the ego vehicle 123A to the preceding vehicle 124 at a specific time t; (2) $\Delta v_E(t)$, which includes digital data that describes a velocity of the ego vehicle 123A relative to a velocity of the preceding vehicle 124 at the specific time t; and (3) $v_E(t)$, which includes digital data that describes a velocity of the ego vehicle 123A at the specific time t. Based these inputs, the mitigation system 199 determines as an output $a_R(t)$, which includes digital data that describes a range-based component of an acceleration of the ego vehicle at the time t. The process flow 161 provides an output that is an input to the process flow 163 described below for FIG. 1F.

In some embodiments, the mitigation system 199 may repeat this process flow 161 (as well as process flows 162 and 163) every 0.10 seconds (or substantially every 0.10 seconds) to correspond with newly received BSM data 195 from the one or more downstream vehicles 123B. In other words, the process flows 161, 162 and 163 are repeated for consecutive times every 0.10 seconds (or substantially every 0.10 seconds). As a result of this repetition interval being this short, the acceleration of the ego vehicle 123A is gradually modified over time so that the ego vehicle 123A smoothly achieves a velocity which is consistent with the preceding vehicle 124 and/or one or more downstream vehicles 123B.

For example, assume the process flows 161, 162 and 163 are executed at a specific time, t, described by the wireless vehicle data and the method is repeated substantially every 0.10 seconds (e.g., t+0.10 seconds) based on new wireless vehicle data for a new time (e.g., t+0.10 seconds) that is substantially 0.10 seconds subsequent to the specific time, t, so that the acceleration of the ego vehicle gradually decreases as the ego vehicle approaches a traffic jam whose effects on the downstream vehicle (e.g., the preceding vehicle 124) are described by the wireless vehicle data for the specific time, t, and the new wireless vehicle data for the new time (e.g., t+0.10 seconds).

Referring now to FIG. 1E, depicted is a block diagram illustrating a process flow 162 executed by the mitigation system 199 according to some embodiments.

As depicted, the mitigation system 199 receives inputs and determines an output based on these inputs. For example, the mitigation system 199 receives one or more of the following: (1) $v_E(t)$, which includes digital data that describes a velocity of the ego vehicle 123A at a specific time t; (2) $s_E(t)$, which includes digital data that describes a location of the ego vehicle 123A at the specific time t; (3) $v_j(t)$, which includes digital data that describes a velocity of the downstream vehicle 123B at the specific time t; (4) $s_j(t)$, which includes digital data that describes a location of the downstream vehicle 123B at the specific time t; (5) $\Delta v_E(t)$, which includes digital data that describes a velocity of the ego vehicle 123A relative to a velocity of the preceding vehicle 124 at the specific time t; and (6) $a_{DSRC}(t-\Delta t)$, which includes digital data that describes a DSRC-based component of acceleration from an earlier time (e.g., prior to t), which is described in more detail below with reference to FIGS. 4A-4C.

In some embodiments, these inputs are used by the mitigation system 199 to determine: (1) $v_p(t)$, which includes digital data that describes a velocity of the preceding vehicle 124 at the specific time t; and (2) $s_p(t)$, which includes digital data that describes a location of the preceding vehicle 124 at the specific time t. For example, the mitigation system 199 includes code and routines that are operable, when executed by a processor of the ego vehicle 123A, to cause the processor to determine $v_p(t)$ by determining the sum of $v_E(t)$ and $\Delta v_E(t)$, i.e., $v_p(t)=v_E(t)+\Delta v_E(t)$. Similarly, the mitigation system 199 includes code and routines that are operable, when executed by the processor of the ego vehicle 123A, to cause the processor to determine $s_p(t)$ by determining the sum of $s_E(t)$ and $h_E(t)$, i.e., $s_p(t)=s_E(t)+h_E(t)$.

The mitigation system 199 also includes code and routines that are operable, when executed by a processor of the ego vehicle 123A, to cause the processor to determine $a_{DSRC}(t)$, which includes digital data that describes a DSRC-based component of acceleration at the time t. The mitigation system 199 may cause the processor to execute this determination based on one or more of the inputs, $v_p(t)$ and $s_p(t)$. This determination is described in more detail below with reference to FIGS. 4A-4C. The process flow 162 provides an output that is an input to the process flow 163 described below for FIG. 1F.

In some embodiments, the mitigation system 199 may repeat this process flow 162 (as well as process flows 161 and 163) every 0.10 seconds (or substantially every 0.10 seconds) to correspond with newly received BSM data 195 from the one or more downstream vehicles 123B. As a result, the acceleration of the ego vehicle 123A is gradually modified over time so that the ego vehicle 123A smoothly achieves a velocity which is consistent with the preceding vehicle 124 and/or one or more downstream vehicles 123B.

Figure 1F:
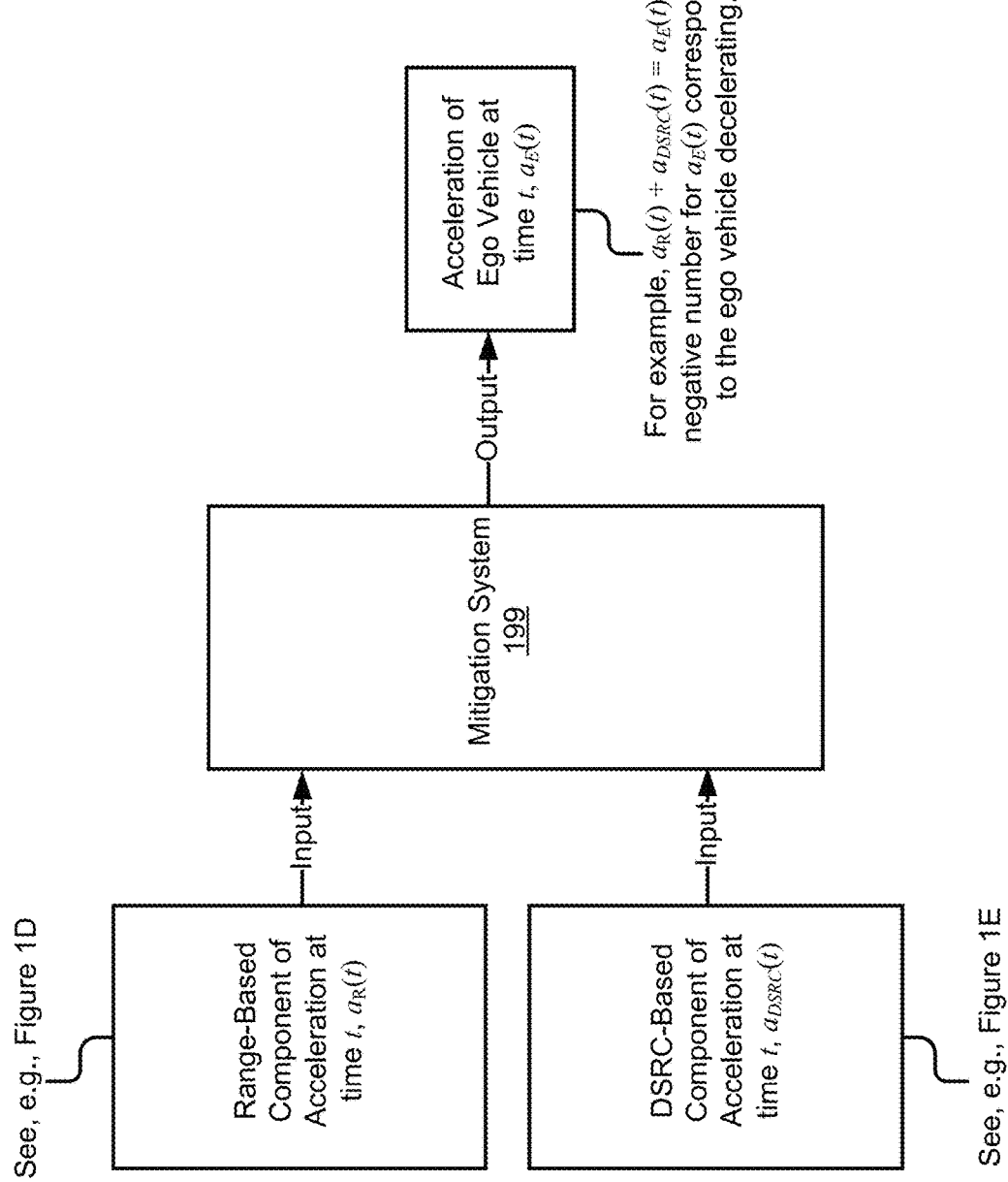

Referring now to FIG. 1F, depicted is a block diagram illustrating a process flow 163 executed by the mitigation system 199 according to some embodiments.

As depicted, the mitigation system 199 receives inputs and determines an output based on these inputs. For example, the mitigation system 199 receives (1) $a_R(t)$, which includes digital data that describes the range-based component of acceleration for time t (which was determined in the process flow 161 described above for FIG. 1D) and (2) $a_{DSRC}(t)$, which includes digital data that describes the DSRC-based component of acceleration at the time t (which was determined in the process flow 162 described above for FIG. 1E). Based these inputs, the mitigation system 199 determines $a_E(t)$, which includes digital data that describes a modification for the acceleration of the ego vehicle at the time t. This modification may be described by the acceleration data 197 of FIG. 1C and inputted to the ADAS system of the mitigation system 199 to modify the acceleration, and thus the velocity, of the ego vehicle 123A as it approaches the preceding vehicle 124 and/or one or more downstream vehicles 123B.

In some embodiments, the mitigation system 199 may repeat this process flow 163 (as well as process flows 161 and 162) every 0.10 seconds (or substantially every 0.10 seconds) to correspond with newly received BSM data 195 from the one or more downstream vehicles. As a result, the acceleration of the ego vehicle 123A is gradually modified over time so that the ego vehicle 123A smoothly achieves a velocity which is consistent with the preceding vehicle 124 and/or one or more downstream vehicles 123B.

Figure 2:
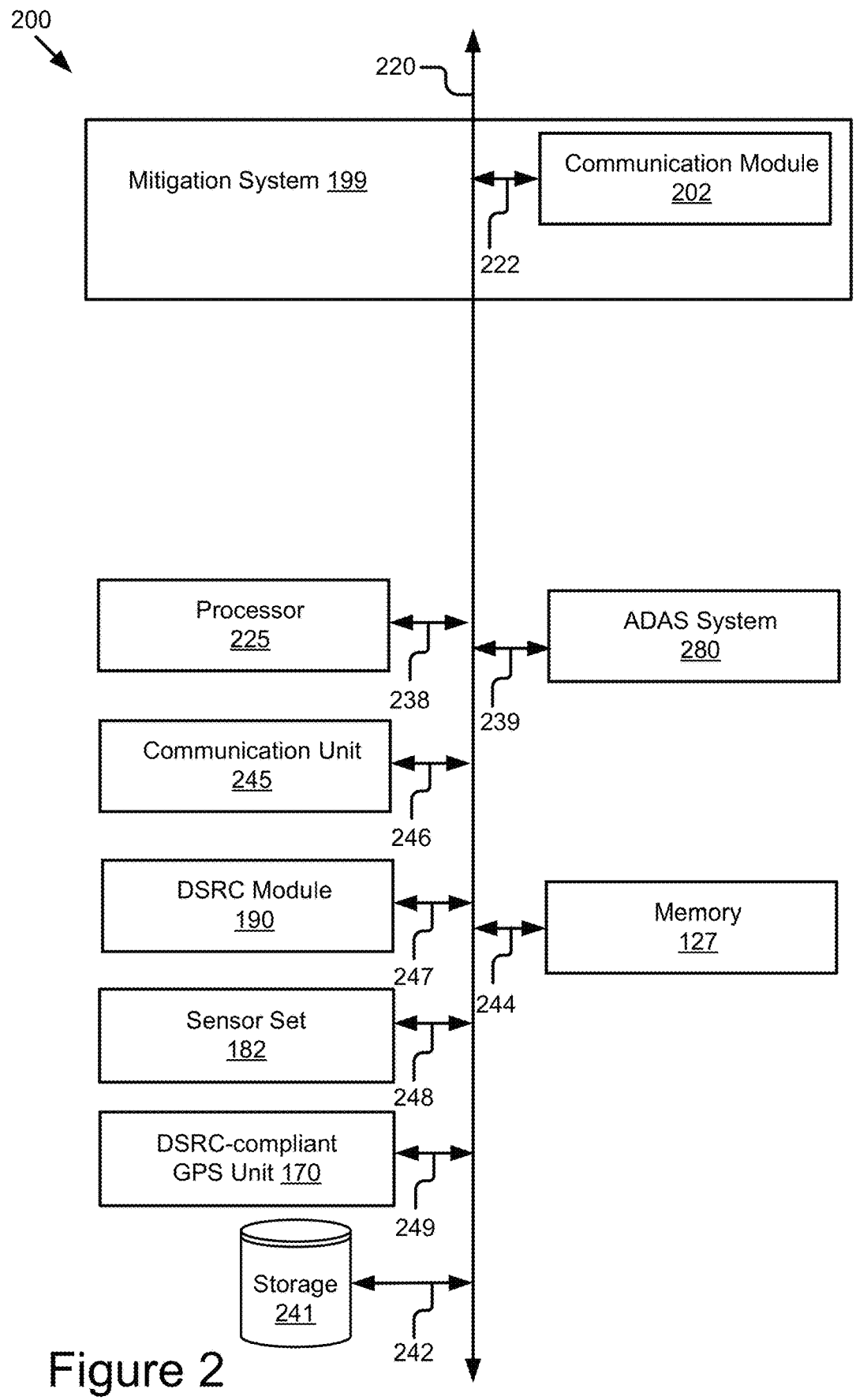
FIG. 2 is a block diagram illustrating an example computer system including a mitigation system according to some embodiments.

Referring now to FIG. 2, depicted is a block diagram illustrating an example computer system 200 including a mitigation system 199 according to some embodiments.

In some embodiments, the computer system 200 may include a special-purpose computer system that is programmed to perform one or more steps of a method 300 described below with reference to FIG. 3A, the method 400 described below with reference to FIGS. 4A-4C or the method 700 described below with reference to FIGS. 7A and 7B.

In some embodiments, the computer system 200 is an element of one or more of the ego vehicle 123A, the downstream vehicle 123B, the preceding vehicle 124, the RSU 104 and the server 103. In some embodiments, the computer system 200 may include an onboard vehicle computer. In some embodiments, the computer system 200 may include an electronic control unit, head unit or some other processor-based computing device.

The computer system 200 may include one or more of the following elements according to some examples: the mitigation system 199; a processor 225; a communication unit 245; the DSRC module 190; the sensor set 182; the DSRC-compliant GPS unit 170; an ADAS system 280; a storage 241; and a memory 127. The components of the computer system 200 are communicatively coupled by a bus 220.

In the illustrated embodiment, the processor 225 is communicatively coupled to the bus 220 via a signal line 238. The communication unit 245 is communicatively coupled to the bus 220 via a signal line 246. The DSRC module 190 is communicatively coupled to the bus 220 via a signal line 247. The sensor set 182 is communicatively coupled to the bus 220 via a signal line 248. A DSRC-compliant GPS unit 170 is communicatively coupled to the bus 220 via a signal line 249. The ADAS system 280 is communicatively coupled to the bus 220 via a signal line 239. The storage 241 is communicatively coupled to the bus 220 via a signal line 242. The memory 127 is communicatively coupled to the bus 220 via a signal line 244.

The DSRC module 190, the sensor set 182, the DSRC module 190 and the DSRC-compliant GPS unit 170 were described above with reference to FIG. 1A, and so, those descriptions will not be repeated here.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. Other processors, operating systems, sensors, displays, and physical configurations may be possible.

The memory 127 stores instructions or data that may be executed by the processor 225. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 stores any of the digital data described herein. In some embodiments, the memory 127 stores any digital data necessary for the computer system 200 (or the mitigation system 199) to provide its functionality.

The communication unit 245 transmits and receives data to and from a network 105 or to another communication channel. In some embodiments, the DSRC module 190 may be an element of the communication unit 245. For example, the communication unit 245 may include a DSRC transceiver, a DSRC receiver and other hardware or software necessary to make the computer system 200 a DSRC-enabled device.

In some embodiments, the communication unit 245 includes a port for direct physical connection to the network 105 or to another communication channel. For example, the communication unit 245 includes a USB, SD, CAT-5, or similar port for wired communication with the network 105. In some embodiments, the communication unit 245 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 245 includes a full-duplex coordination system as described in U.S. patent application Ser. No. 14/471,387 filed on Aug. 28, 2014 and entitled "Full-Duplex Coordination System."

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The ADAS system 280 may include one or more advanced driver assistance systems. Examples of an ADAS system 280 may include one or more of the following elements of the ego vehicle 123A: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system 280 includes any hardware or software that controls one or more operations of a vehicle to that the vehicle is "autonomous" or "semi-autonomous."

In the illustrated embodiment shown in FIG. 2, the mitigation system 199 includes a communication module 202 communicatively coupled to the bus 220. In some embodiments, components of the mitigation system 199 can be stored in a single server or device. In some other embodiments, components of the mitigation system 199 can be distributed and stored across multiple servers or devices.

The communication module 202 can be software including routines for handling communications between the mitigation system 199 and other components of the computer system 200. In some embodiments, the communication module 202 can be a set of instructions executable by the processor 225 to provide the functionality described below for handling communications between the mitigation system 199 and other components of the computer system 200. In some embodiments, the communication module 202 can be stored in the memory 127 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environments 100, 111, 112. For example, the communication module 202 receives, via the communication unit 245, a BSM, DSRC message, DSRC probe or full-duplex wireless message including the BSM data 195 (or similar digital data).

In some embodiments, the communication module 202 receives data from components of the mitigation system 199 (or one or more of the example operating environments 100, 111, 112) and stores the data in one or more of the storage 241 and the memory 127. For example, the communication module 202 receives the sensor data 196 and stores the sensor data 196 in the memory 127. In another example, the communication module 202 may receive the ego location data included in the sensor data 196 from the DSRC-compliant GPS unit 170 and store the ego location data in the memory 127.

In some embodiments, the communication module 202 may handle communications between components of the mitigation system 199. For example, the communications module 202 may handle communications between the mitigation system 199 and one or more other elements of the computer system 200.

The mitigation system 199 includes software including routines for using one or more of the sensors included in the sensor set 182 to generate the sensor data 196. For example, the mitigation system 199 may include code and routines that, when executed by the processor 225, cause the processor 225 to operate one or more of the sensors included in the sensor set 182 to record measurements of the physical environment proximate to the computer system 200 (e.g., the ego vehicle 123A) and generate the sensor data 196 which describes these measurements (e.g., describing the preceding vehicle 124 such as the velocity of the preceding vehicle 124, the location of the preceding vehicle 124, the range from the ego vehicle 123A to the preceding vehicle 124, etc.). The mitigation system 199 causes the sensor data 196 to be stored in the memory 127. The sensor data 196 may describe one or more measurements recorded by one or more sensors of the sensor set 182 or calculations determined by the mitigation system 199 based on these measurements.

The mitigation system 199 includes code and routines which, when executed by the processor 225, cause the processor 225 to execute one or more steps of the methods 300, 400, 700 described below with reference to FIG. 3A, FIGS. 4A-4C and FIGS. 7A and 7B.

In some embodiments, the mitigation system 199 includes code and routines which, when executed by the processor 225, causes the processor 225 to perform steps including one or more of the following: (1) receiving, via the DSRC module 190, a DSRC-based wireless message (e.g., a DSRC message, a DSRC probe, a BSM or any other wireless message which conforms to the DSRC standard or any derivative thereof) that includes wireless vehicle data (e.g., BSM data 195 or any data which is included in the BSM data 195, data set 193 or data set 198) and is wirelessly received via a DSRC channel of the DSRC module 190, where the DSRC-based wireless message and the wireless vehicle data are compliant with the DSRC standard regulating the transmission of the DSRC-based wireless message and the content of the wireless vehicle data; (2) determining that the wireless vehicle data describes a presence of a traffic obstruction 181 that is at a location downstream of the computer system 200 (or the ego vehicle 123A which includes the computer system 200) and within a same lane of travel as the computer system 200 (or the ego vehicle 123A which includes the computer system 200), where the location is described by the wireless vehicle data with lane-level accuracy; (3) determining the preceding velocity ($v_P(t)$) of the preceding vehicle 124 that is traveling directly in front of the computer system 200 (or the ego vehicle 123A which includes the computer system 200); and (4) modifying an ego velocity ($v_E(t)$) of the computer system 200 (or the ego vehicle 123A which includes the computer system 200) based on the preceding velocity and the presence of the traffic obstruction 181. The ego velocity is modified by the computer system 200 so that the ego velocity is substantially equal to the preceding velocity prior to the computer system 200 (or the ego vehicle 123A which includes the computer system 200) arriving at the location of the traffic obstruction 181 and the computer system 200 (or the ego vehicle 123A which includes the computer system 200) does not collide with a set of downstream vehicles including the preceding vehicle.

In some embodiments, the mitigation system 199 includes code and routines which, when executed by the processor 225, causes the processor 225 to perform steps including determining a downstream velocity ($v_j(t)$) of a downstream vehicle 123B that is located, when compared to the preceding vehicle 124, further downstream of the computer system 200 (or the ego vehicle 123A which includes the computer system 200) than the preceding vehicle 124, wherein modifying the ego velocity ($v_E(t)$) as described in the preceding paragraph includes modifying the ego velocity ($v_E(t)$) of the computer system 200 (or the ego vehicle 123A which includes the computer system 200) based on the preceding velocity, the downstream velocity and the presence of the traffic obstruction. The ego velocity is modified by the computer system 200 (or the ego vehicle 123A which includes the computer system 200) so that the ego velocity is less than or substantially equal to the preceding velocity within an initial time period (e.g., an estimated time before the ego vehicle 123A collides with the preceding vehicle 124) and less than or substantially equal to the downstream velocity and the preceding velocity prior to the computer system 200 (or the ego vehicle 123A which includes the computer system 200) arriving at the location of the traffic obstruction 181 so that the computer system 200 (or the ego vehicle 123A which includes the computer system 200) does not collide with the preceding vehicle 124 or the downstream vehicle 123B.

In some embodiments, the computer system 200 (or the mitigation system 199) does not have knowledge of the endpoints included in the network 105 which transmits data (e.g., the wireless vehicle data) among the ego vehicle and one or more other connected devices (e.g., the preceding vehicle 124, the downstream vehicle 123B, an RSU 104, the server 103, etc.). For example, the computer system 200 (or the mitigation system 199) does not have access to data that describes one or more of the following: the architecture of the network 105; the address information for the endpoints of this network 105; the total number of endpoints of this network 105; the identity of the endpoints of this network 105; and the entity type for each of the endpoints of the network 105 (e.g., is the endpoint a vehicle, server, RSU, etc.), etc.

In some embodiments, the mitigation system 199 includes code and routines which, when executed by the processor 225, causes the processor 225 to perform steps including one or more of the following: (1) receiving, via the DSRC module 190, a DSRC-based wireless message (e.g., a DSRC message, a DSRC probe, a BSM or any other wireless message which conforms to the DSRC standard or any derivative thereof) that includes wireless vehicle data (e.g., BSM data 195 or any data which is included in the BSM data 195, data set 193 or data set 198) and is wirelessly received via a DSRC channel of the DSRC module 190, where the DSRC-based wireless message and the wireless vehicle data are compliant with the DSRC standard regulating the transmission of the DSRC-based wireless message and the content of the wireless vehicle data; (2) determining that the wireless vehicle data describes a presence of a traffic obstruction 181 that is at a location downstream of the computer system 200 (or the ego vehicle 123A which includes the computer system 200) and within a same lane of travel as the computer system 200 (or the ego vehicle 123A which includes the computer system 200), where the location is described by the wireless vehicle data with lane-level accuracy; determining a relative velocity ($\Delta v_E(t)$) between the computer system 200 (or the ego vehicle 123A which includes the computer system 200) and the preceding vehicle 124 that is traveling directly in front of the computer system 200 (or the ego vehicle 123A which includes the computer system 200); and (3) modifying an ego velocity ($v_E(t)$) of the computer system 200 (or the ego vehicle 123A which includes the computer system 200) based on the preceding velocity and the presence of the traffic obstruction 181, where the ego velocity is modified so that (a) the ego velocity is less than or substantially equal to one or more of the downstream velocity and the preceding velocity prior to the computer system 200 (or the ego vehicle 123A which includes the computer system 200) arriving at the location of the traffic obstruction 181 and (b) the ego vehicle 123A does not collide with one or more of the preceding vehicle 124, the downstream vehicles 123B, 123N.

In some embodiments, the mitigation system 199 includes code and routines which, when executed by the processor 225, causes the processor 225 to perform steps including one or more of the following: (1) receiving a wireless message (e.g., a DSRC-based wireless message, a cellular-based message, a Wi-Fi-based message, a millimeter wave communication message, a full-duplex wireless communication message, etc.) that includes wireless vehicle data that is compliant with the DSRC standard (e.g., BSM data 195 or any data which is included in the BSM data 195, data set 193 or data set 198); (2) determining that the wireless vehicle data describes a presence of a traffic obstruction 181 (optionally, with lane-level accuracy) that is at a location downstream of the computer system 200 (or the ego vehicle 123A which includes the computer system 200) and within a same road of travel as the ego vehicle 123A (or lane of travel of the ego vehicle 123A); and (3) modifying the ego velocity of the computer system 200 (or the ego vehicle 123A which includes the computer system 200) prior to the computer system 200 (or the ego vehicle 123A which includes the computer system 200) arriving at the location of the traffic obstruction 181.

In some embodiments, the mitigation system 199 includes code and routines that, when executed by the processor 225, cause the processor 225 to determine a preceding velocity of the preceding vehicle 124 that is traveling directly in front of the ego vehicle 123A.

In some embodiments, modifying the ego velocity includes modifying the ego velocity based on the preceding velocity and the presence of the traffic obstruction 181 so that the ego velocity is less than or substantially equal to the preceding velocity prior to the computer system 200 (or the ego vehicle 123A which includes the computer system 200) arriving at the location of the traffic obstruction 181.

In some embodiments, the mitigation system 199 includes code and routines that, when executed by the processor 225, cause the processor 225 to execute an onboard sensor of the sensor set 182 to generate sensor data 196 describing one or more velocities of one or more vehicles traveling on the same road of travel as the computer system 200 (or the ego vehicle 123A which includes the computer system 200).

In some embodiments, the mitigation system 199 includes code and routines that, when executed by the processor 225, cause the processor 225 to analyze the wireless vehicle data to identify the presence of the traffic obstruction based on one or more patterns of behavior of the one or more downstream vehicles over the one or more specific times (e.g., t) described by the wireless vehicle data. In this way a pattern of behavior may be identified and this pattern may indicate the presence of a traffic obstruction at a location which is also described by the wireless vehicle data.

In some embodiments, the mitigation system 199 includes code and routines that, when executed by the processor 225, cause the processor 225 to provide acceleration data to the ADAS system 280. The acceleration data may describe an acceleration for modifying the ego velocity of the ego vehicle, and the ADAS system 280 modifying the acceleration of the computer system 200 (or the ego vehicle 123A which includes the computer system 200) so that the velocity of the computer system 200 (or the ego vehicle 123A which includes the computer system 200) is less than or substantially equal to a preceding velocity of a preceding vehicle 124 traveling directly in front of the computer system 200 (or the ego vehicle 123A which includes the computer system 200).

In some embodiments, the mitigation system 199 includes code and routines that, when executed by the processor 225, cause the processor 225 to provide acceleration data to the ADAS system 280. The acceleration data may describe an acceleration for modifying the ego velocity of the ego vehicle, and the ADAS system 280 modifying the acceleration of the computer system 200 (or the ego vehicle 123A which includes the computer system 200) so that the velocity of the computer system 200 (or the ego vehicle 123A which includes the computer system 200) is less than or substantially equal to a downstream velocity of one or more downstream vehicles 123B, 123N traveling downstream of the computer system 200 in the same lane as the ego vehicle 123A.

In some embodiments, the mitigation system 199 includes code and routines that, when executed by the processor 225, cause the processor 225 to execute the steps described above at a specific time described by the wireless vehicle data and these steps are repeated substantially every 0.10 seconds based on new wireless vehicle data for a new wireless message which is received by the DSRC module 190. Each instance of new wireless vehicle data describes a new time that is substantially 0.10 seconds subsequent to the specific time (e.g., t) included in the initial instance of wireless vehicle data so that the ego velocity gradually decreases as the computer system 200 (or the ego vehicle 123A which includes the computer system 200) approaches the traffic obstruction 181.

In some embodiments, the communication unit 245 or the DSRC module 190 are operable to receive a wireless message that includes DSRC-based wireless vehicle data (e.g., BSM data or data that includes content similar to BSM data as depicted in FIG. 5A or 5B, or otherwise described herein). The DSRC-based wireless vehicle data is transmitted to the mitigation system 199. In some embodiments, the mitigation system 199 includes code and routines that, when executed by the processor 225, cause the processor 225 to: (1) determine a modification for a velocity of the computer system 200 (or the ego vehicle 123A which includes the computer system 200) based on a traffic obstruction 181 described by the DSRC-based wireless vehicle data (e.g., an acceleration of the ego vehicle which is determined by the mitigation system 199 as to achieve a desired velocity for the ego vehicle); (2) provide, to the ADAS system 280, modification data (e.g., $a_E(t)$ or data similar to or derived therefrom) that describes the modification; and (3) execute the ADAS system 280 based on the modification data so that the velocity of the computer system 200 (or the ego vehicle 123A which includes the computer system 200) is modified based on receipt of the DSRC-based wireless vehicle data. In some embodiments, this modification is implemented prior to the computer system 200 (or the ego vehicle 123A which includes the computer system 200) arriving at a location of the traffic obstruction 181.

Figure 3A:
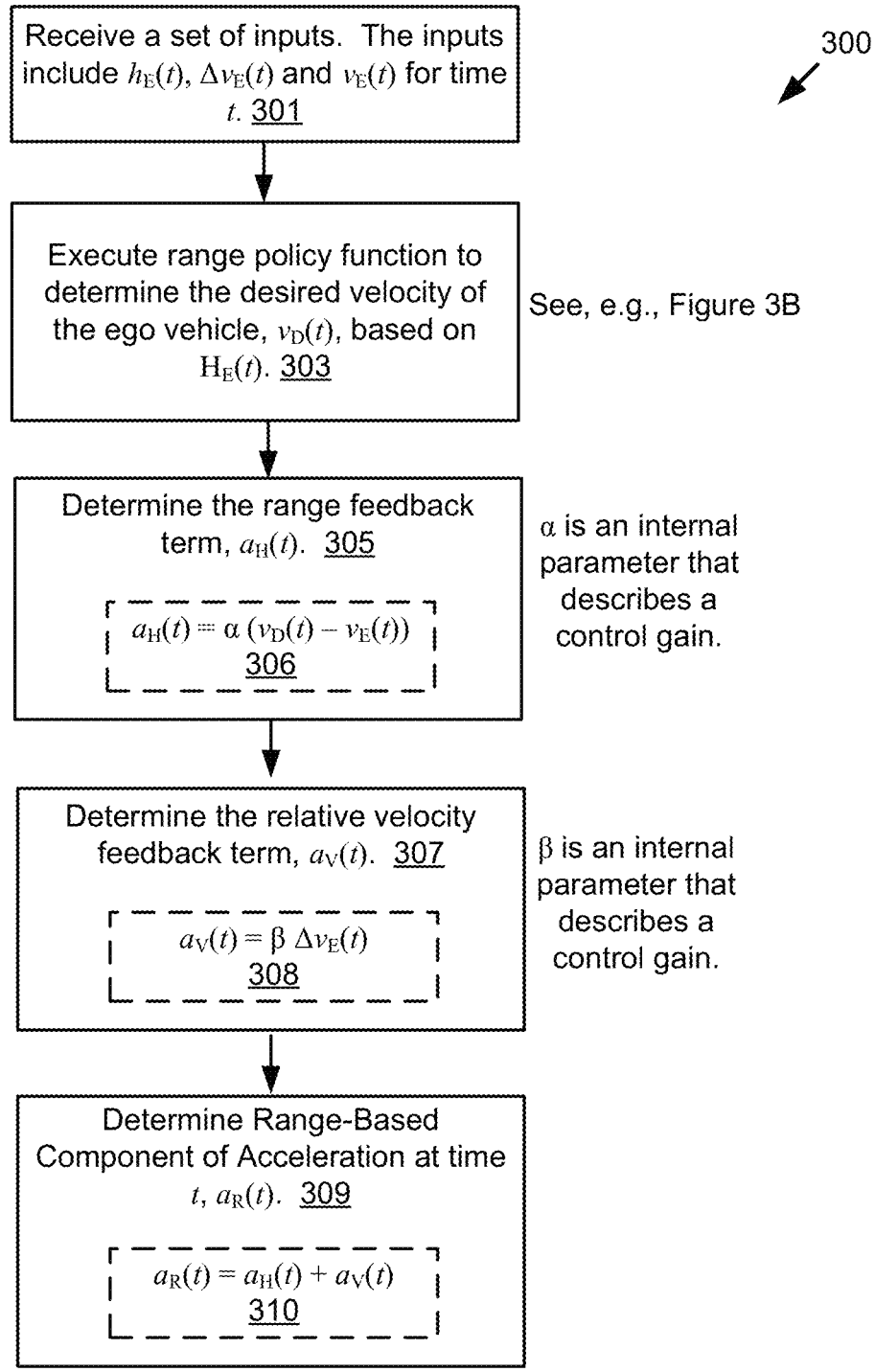
FIG. 3A is a flowchart of an example method for estimating a range-based component of acceleration at a specific time according to some embodiments.

Referring now to FIG. 3A, depicted is a flowchart of an example method 300 for estimating $a_R(t)$, a range-based component of acceleration at a specific time t according to some embodiments. One or more of the steps described herein for the method 300 may be executed by one or more computer systems such as that described above with reference to FIG. 2.

At step 301, a set of inputs are received. The set of inputs include $h_E(t)$, $\Delta v_E(t)$ and $v_E(t)$ for time t.

At step 303, a range policy function is executed to determine the desired velocity of the ego vehicle, $v_D(t)$, based on $h_E(t)$. See, for example, FIG. 3B. The range policy function is stored as digital data on the memory 127. The desired velocity may be a velocity that ensures the ego vehicle does not collide with the preceding vehicle or some other downstream vehicle. The ego vehicle may record the velocity of the preceding vehicle (or receive it via a wireless vehicle message) and the range from the ego vehicle to the preceding vehicle for this purpose.

At step 305, the range feedback term, $a_H(t)$, is determined. Sub-step 306 depicts an example analysis executed by the mitigation system to determine the range feedback term: $a_H(t)=\alpha\ (v_D(t)-v_E(t))$, where a first internal parameter, $\alpha$, describes a control gain for a range finder sensor included in the sensor set. The first internal parameter $\alpha$ is stored as digital data in the memory 127. In some embodiments, this control gain is a parameter that causes the mitigation system to adjust the sensitivity of the vehicle's response to the range finder sensor based on the control gain. For example, the ADAS system of the ego vehicle responds differently to the range measurement (e.g., $h_E(t)$) recorded by the range finder sensor. If the gain is a higher value, then the ADAS system responds more severely (e.g., braking harder, turning harder or other responses that are more severe or extreme relative to the response of the ADAS system if the gain were a lower value). If the gain is a lower value, then the ADAS system responds less severely (e.g., not braking, not turning or other responses that are not sufficiently severe relative to the response of the ADAS system if the gain were a higher value).

At step 307, the relative velocity feedback term, $a_V(t)$, is determined. Sub-step 308 depicts an example analysis executed by the mitigation system to determine the relative velocity feedback term: $a_V(t)=\beta\Delta v_E(t)$. Here, $\Delta v_E(t)$ includes a second internal parameter, $\beta$, which describes a control gain for determining the relative velocity feedback term. The second internal parameter $\beta$ is stored as digital data in the memory 127.

At step 309, a range-based component of acceleration at time t, $a_R(t)$, is determined. Sub-step 310 depicts an example analysis executed by the mitigation system to determine the range-based component of acceleration at time t: $a_R(t)=a_H(t)+a_V(t)$.

Figure 3B:
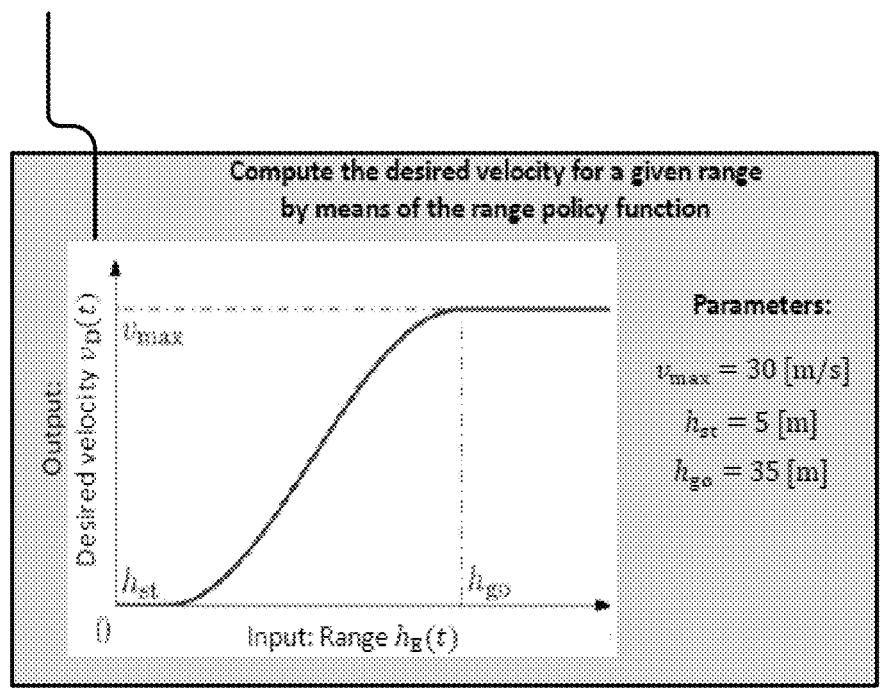
FIG. 3B is a block diagram illustrating an example range policy function according to some embodiments.

Referring now to FIG. 3B depicted is a block diagram illustrating an example range policy function 304 according to some embodiments. FIG. 3B also depicts an example 399 of using the range policy function 304 based on receiving the range $h_E(t)$ as an input to the range policy function 304 to yield an output that includes digital data that describes the desired velocity of the ego vehicle, $v_D(t)$.

Figure 4A:
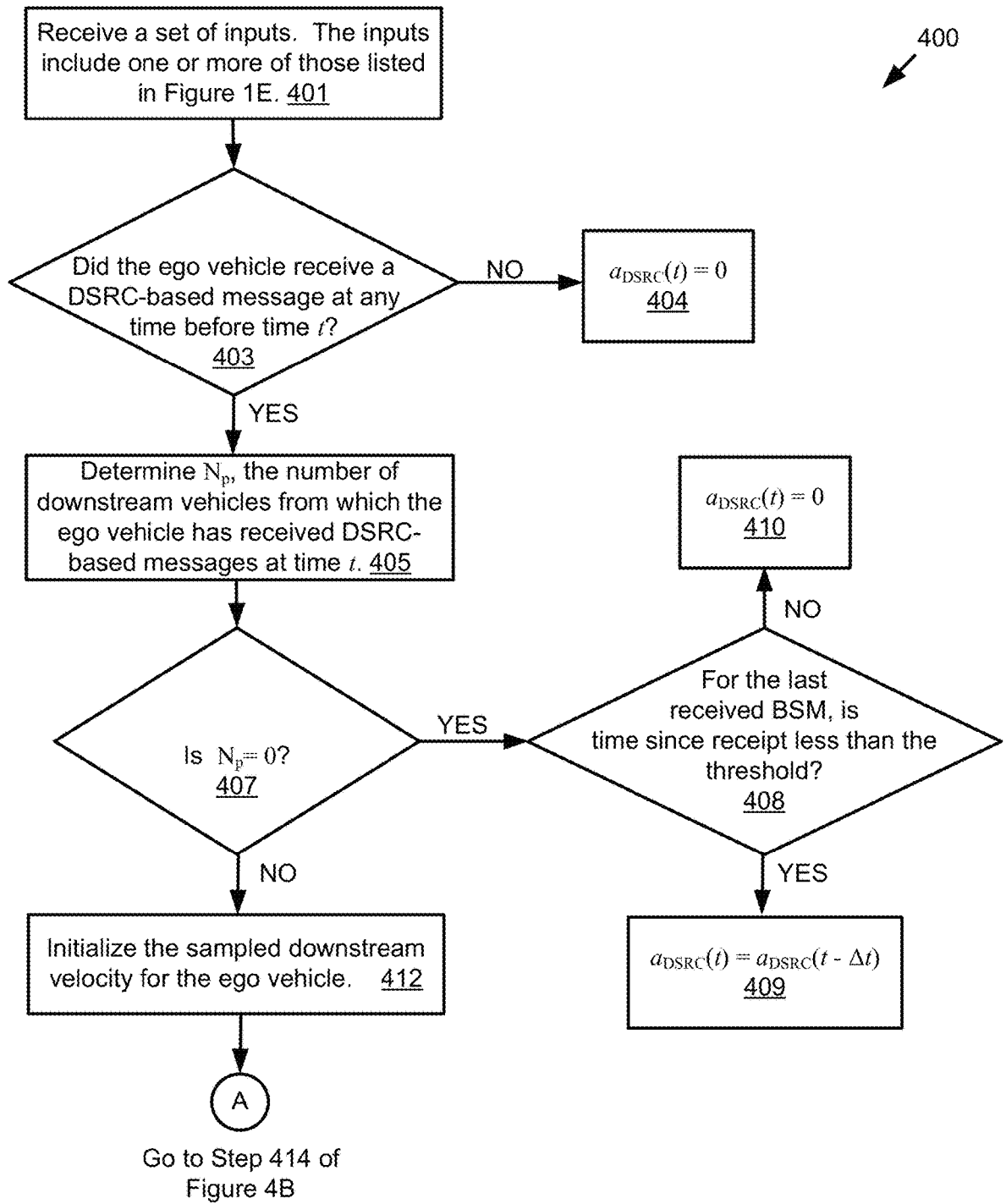
FIGS. 4A-4C are a flowchart of an example method for estimating a DSRC-based component of acceleration at a specific time according to some embodiments.
Figure 4B:
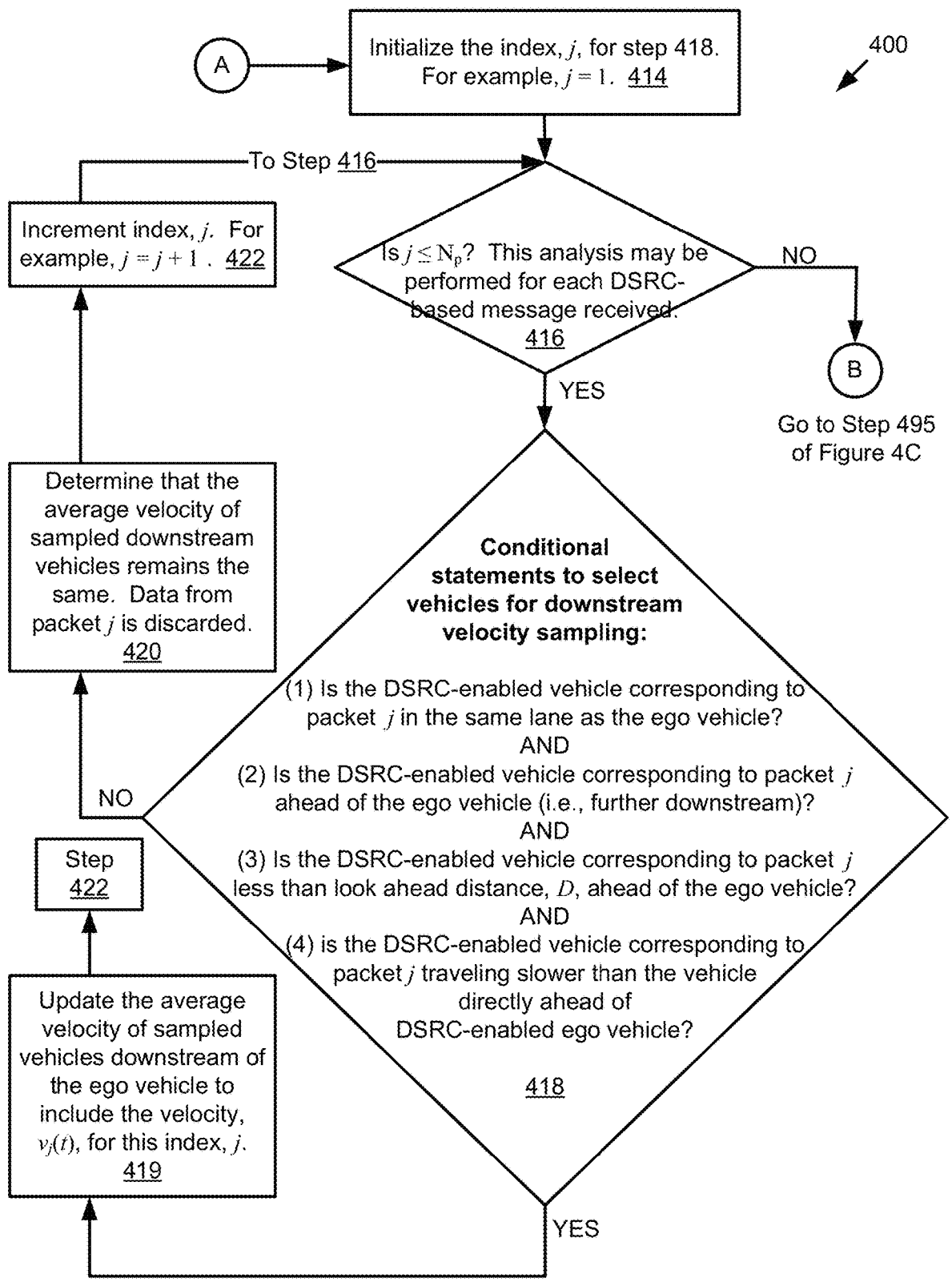
Figure 4C:
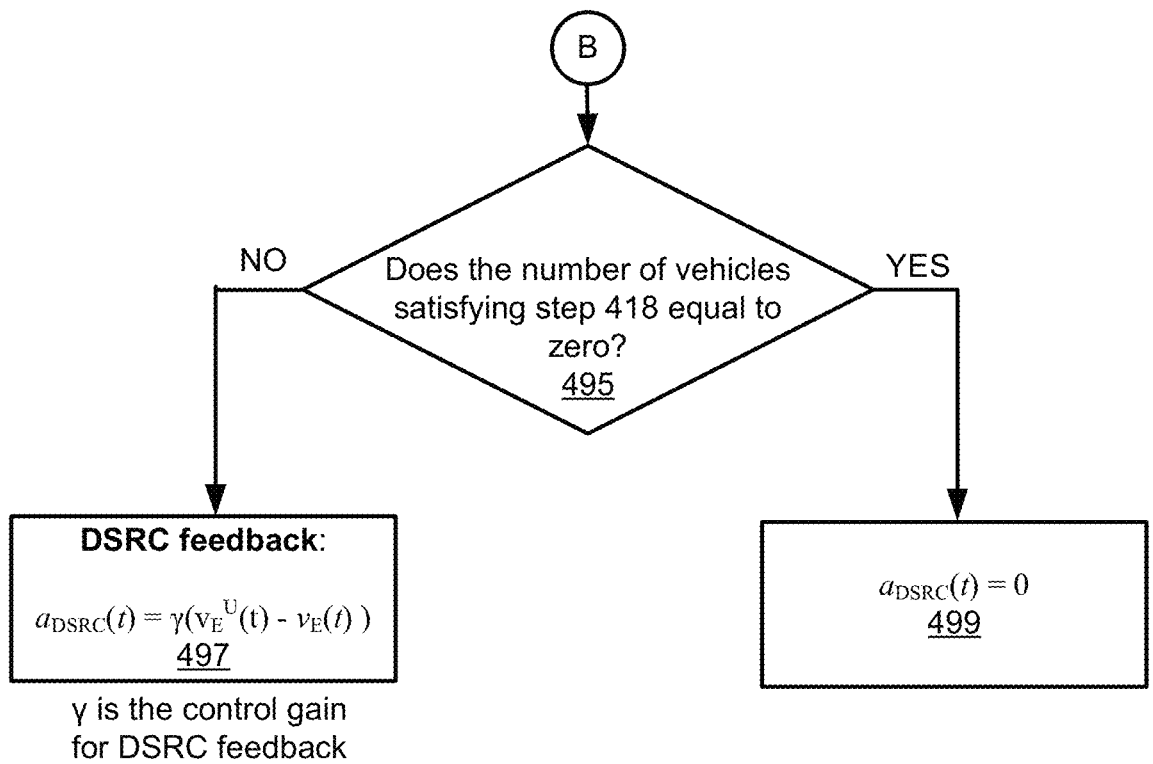

Referring now to FIGS. 4A-4C, depicted is a flowchart of an example method 400 for estimating $a_{DSRC}(t)$, a DSRC-based component of acceleration at a specific time t according to some embodiments.

At step 401, a set of inputs are received. The inputs include one or more of those listed in FIG. 1E.

At step 403, a determination is made regarding whether the ego vehicle received a DSRC-based message at any time before time t. If the ego vehicle is determined to not have received a DSRC-based message at a time before time t at step 403, then the method 400 proceeds to step 404. If the ego vehicle is determined to have received a DSRC-based message at a time before time t at step 403, then the method 400 proceeds to step 405. In some embodiments, the method 400 only considers DSRC-based messages received from downstream vehicles (which may include the preceding vehicle if it is DSRC-enabled) that are within a "look-ahead distance" of the driver of the ego vehicle, i.e., downstream vehicles which are within 500 meters (or substantially 500 meters) along the road from the ego vehicle.

At step 404, $a_{DSRC}(t)$ is determined to be equal to zero.

At step 405, $N_p$ is determined, which is digital data that describes a number of downstream vehicles (which may include the preceding vehicle if it is DSRC-enabled) from which the ego vehicle has received DSRC-based messages at time t.

At step 407, a determination is made regarding whether $N_p$ is equal to zero. If $N_p$ is determined not to be equal to zero at step 407, then the method 400 proceeds to step 408. If $N_p$ is determined to be equal to zero at step 407, then the method 400 proceeds to step 412.

At step 408, a determination is made regarding whether, for the last received BSM (or other wireless message including data similar to the BSM data), is the time since receipt less than a lifetime threshold.

In some embodiments, the lifetime threshold indicates an amount of time after which the BSM data is not reliable. The memory 127 includes digital data that describes the lifetime threshold.

If the amount of time is determined at step 408 to not be less than the lifetime threshold, then the method 400 proceeds to step 410. If the amount of time is determined at step 408 to be less than the lifetime threshold, then the method 400 proceeds to step 409.

At step 409, $a_{DSRC}(t)$ is determined to be equal to $a_{DSRC}(t-\Delta t)$.

At step 410, $a_{DSRC}(t)$ is determined to be equal to zero.

At step 412, the sampled downstream velocity for the ego vehicle is initialized. For example, the sampled downstream velocity is represented by $v_E^U(t)$, which is then initialized to identify samples of the downstream velocity for one or more downstream vehicles (or the velocity of the preceding vehicle) at a specified time t.

Referring now to FIG. 4B. At step 414, the index, j, is initialized for step 418. For example, j=1.

Steps 412 and 414, together, ensure that each of the instances of wireless vehicle data for a specified time t (e.g., each set of BSM data included in a received BSM at time t) that is received by the ego vehicle is analyzed in accordance with steps 416 or 418. Steps 416 and 418 may be executed for each of the received wireless vehicle messages, e.g., for each received DSRC-based message (which would include all received BSMs and DSRC probes as well as conventional DSRC messaged received by the ego vehicle) including wireless vehicle data describing one or more downstream vehicles (which may include the preceding vehicle if it is DSRC-enabled) for time t.

At step 416, a determination is made regarding whether $j<N_p$. This analysis may be performed for each DSRC-based message received. If j is not less than $N_p$ at step 416, then the method 400 proceeds to step 495. If j is less than $N_p$ at step 416, then the method 400 proceeds to step 418.

At step 418, a determination is made regarding whether each of four conditions listed in step 418 is met. If not, then the method 400 proceeds to step 420. If so, then the method 400 proceeds to step 419.

At step 419, the average velocity of sampled vehicles downstream of the ego vehicle is updated to include the velocity, $v_j(t)$, for this index, j. The method 400 now proceeds to step 422 from step 419.

At step 420, a determination is made that the average velocity of sampled downstream vehicles (which may include the velocity of the preceding vehicle) remains the same and data from packet j is discarded.

At step 422, index, j, is incremented. For example, j=j+1. The method 400 then proceeds to step 416.

Referring now to FIG. 4C. At step 495, a determination is made regarding whether the number of vehicles satisfying step 418 is equal to zero. For example, if all the BSMs received for time t are analyzed and none include data that satisfy each condition of step 418, then the number of vehicles at step 495 is determined to be equal to zero. If so, the method 400 proceeds to step 499. If not, the method 400 proceeds to step 497.

At step 499, $a_{DSRC}(t)$ is determined to be equal to zero. At step 497, $a_{DSRC}(t)$ is determined to be equal to $\gamma(v_E^U(t)-v_E(t))$, where $\gamma$ is a control gain for the DSRC feedback.

Referring now to FIG. 5A, depicted is a block diagram illustrating an example of the BSM data 195 according to some embodiments.

The regular interval for transmitting BSMs may be user configurable. In some embodiments, a default setting for this interval may be transmitting the BSM every 0.10 seconds or substantially every 0.10 seconds.

A BSM may be broadcasted over the 5.9 GHz DSRC band. DSRC range may be substantially 1,000 meters. In some embodiments, DSRC range may include a range of substantially 100 meters to substantially 1,000 meters.

Referring now to FIG. 5B, depicted is a block diagram illustrating an example of BSM data 195 according to some embodiments.

A BSM may include two parts. These two parts may include different BSM data 195 as shown in FIG. 4B.

Part 1 of the BSM data 195 may describe one or more of the following: vehicle position; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle traveling along a roadway system.

In some embodiments, the BSM data 195 includes a unique identifier of the vehicle which transmitted the BSM including the BSM data 195, as well as the geographic location of this vehicle, such that the mitigation system 199 includes code and routines operable to accurately determine the identity and location of the vehicle described by the BSM data 195.

Figure 7B:
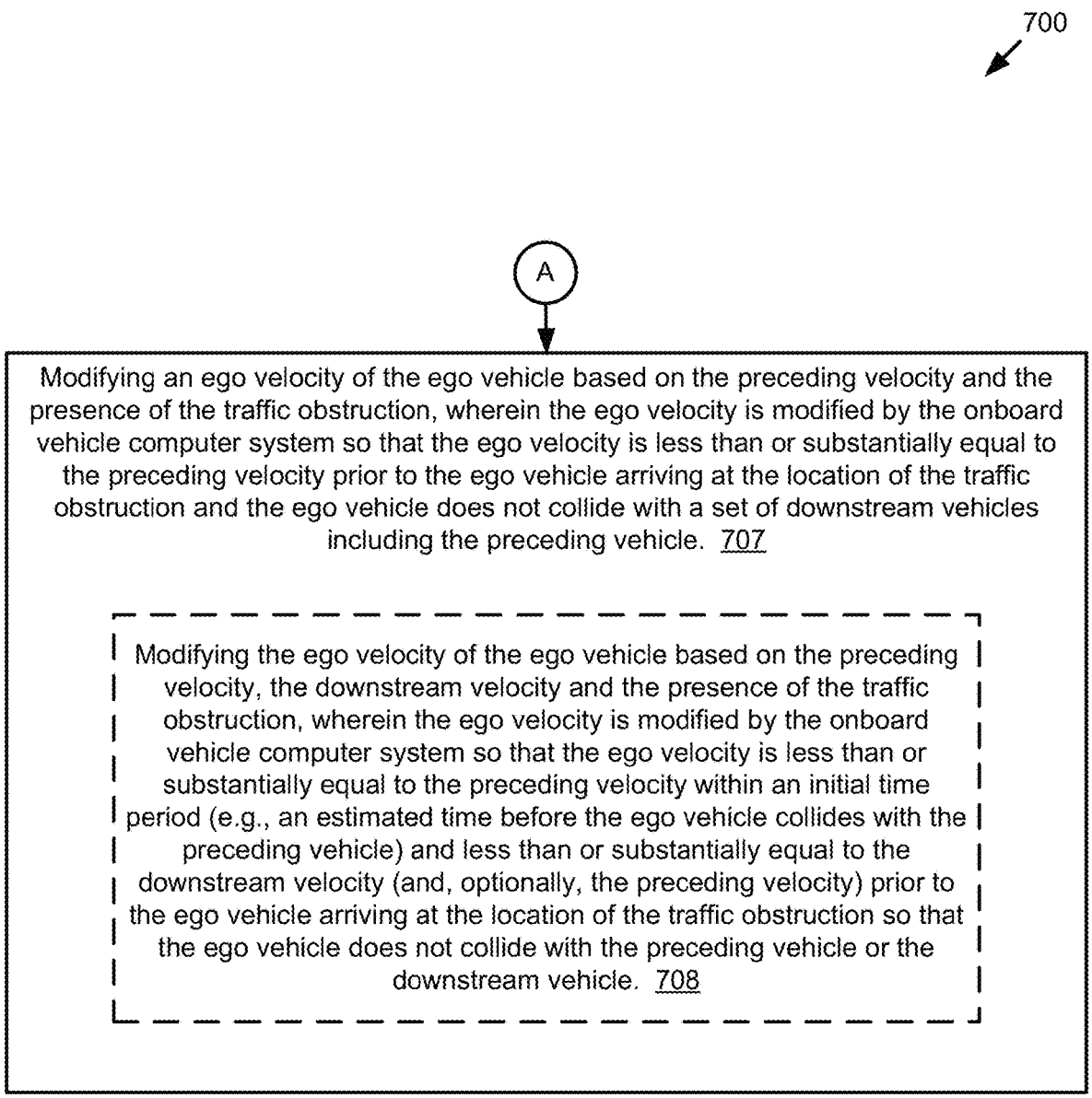

FIGS. 7A and 7B include a flowchart of an example method 700 for modifying an ego velocity of an ego vehicle according to some embodiments. One or more of the steps described herein for the method 700 may be executed by one or more computer systems such as that described above with reference to FIG. 2.

Referring now to FIG. 7A. At step 701, a DSRC-based wireless message is received. The DSRC-based wireless message is received via the DSRC module of the ego vehicle. The DSRC-based wireless message includes wireless vehicle data and is wirelessly received via a DSRC channel of the DSRC module. The DSRC-based wireless message and the wireless vehicle data are compliant with a DSRC standard regulating a transmission of the DSRC-based wireless message and content of the wireless vehicle data. The DSRC-based wireless message may include a DSRC message, a DSRC probe, a BSM or any other wireless message compliant with the DSRC standard. The content of the wireless vehicle data may include any of the data described above for the BSM data 195.

At step 703, the content of the wireless vehicle data is analyzed and determined to indicate that the wireless vehicle data describes a presence of a traffic obstruction that is at a location downstream of the ego vehicle and within a same lane of travel as the ego vehicle. The location of the traffic obstruction is described by the wireless vehicle data with lane-level accuracy.

Step 704 is an optional sub-step of step 703. Step 704 includes analyzing the wireless vehicle data and determining a downstream velocity of a downstream vehicle that is located, when compared to a preceding vehicle described below for step 705, further downstream of the ego vehicle. The downstream velocity is described by the wireless vehicle data. For example, the wireless vehicle data includes BSM data describing the downstream velocity for the downstream vehicle. The downstream vehicle may include a DSRC-equipped vehicle that transmitted the DSRC-based wireless message described above for step 701.

At step 705, a preceding velocity of a preceding vehicle is determined. The preceding vehicle is traveling directly in front of the ego vehicle and in the same lane of travel as the ego vehicle. The preceding velocity may be determined by executing one or more onboard sensors of the ego vehicle that measure the velocity of the preceding vehicle. Optionally, the preceding velocity may be described by the wireless vehicle data described above for step 701.

Referring now to FIG. 7B. At step 707, an ego velocity of the ego vehicle is modified based on the preceding velocity and the presence of the traffic obstruction. For example, the ego velocity is modified by the onboard vehicle computer system of the ego vehicle so that the ego velocity is less than or substantially equal to the preceding velocity prior to the ego vehicle arriving at the location of the traffic obstruction and the ego vehicle does not collide with a set of downstream vehicles including the preceding vehicle. The set of downstream vehicles may include vehicles traveling in the same lane as the ego vehicle and the preceding vehicle.

Step 708 is an optional step which may replace step 707 in some embodiments of the method 700. Step 708 includes modifying the ego velocity of the ego vehicle based on the preceding velocity, the downstream velocity and the presence of the traffic obstruction. For example, the ego velocity is modified by the onboard vehicle computer system of the ego vehicle so that the ego velocity is less than or substantially equal to the preceding velocity within an initial time period (e.g., an estimated time before the ego vehicle collides with the preceding vehicle) and less than or substantially equal to the downstream velocity (and, optionally, the preceding velocity) prior to the ego vehicle arriving at the location of the traffic obstruction so that the ego vehicle does not collide with the preceding vehicle or the downstream vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by an onboard vehicle computer system of an ego vehicle, the method comprising:
    determining, from wireless vehicle data that corresponds to a set of downstream vehicles that are downstream of the ego vehicle during a predetermined time period, that the wireless vehicle data describes a presence of a traffic obstruction that is at a location downstream of the ego vehicle;
    determining a preceding velocity of a preceding vehicle that is traveling directly in front of the ego vehicle;
    determining an acceleration for the ego vehicle based on a distance between the ego vehicle and the preceding vehicle, a range feedback term, and a relative velocity feedback term; and
    modifying the acceleration of the ego vehicle, wherein the acceleration is modified by the onboard vehicle computer system so that the ego vehicle does not collide with the preceding vehicle or the set of downstream vehicles.

2. The method of claim 1, further comprising:
    determining a downstream velocity of a downstream vehicle that is located, when compared to the preceding vehicle, further downstream of the ego vehicle than the preceding vehicle; and
    modifying an ego velocity of the ego vehicle based on the preceding velocity, the downstream velocity and the presence of the traffic obstruction, wherein the ego velocity is modified by the onboard vehicle computer system so that the ego velocity is less than or substantially equal to the preceding velocity within an initial time period and less than or substantially equal to the downstream velocity and the preceding velocity prior to the ego vehicle arriving at the location of the traffic obstruction so that the ego vehicle does not collide with the preceding vehicle or the downstream vehicle.

3. The method of claim 1, further comprising providing a notification to a driver of the ego vehicle that describes the traffic obstruction or a recommended mitigating action.

4. The method of claim 1, further comprising modifying an ego velocity of the ego vehicle by determining an estimated time before the ego vehicle collides with the preceding vehicle based on a relative velocity of the ego vehicle and the preceding vehicle.

5. The method of claim 1, wherein the acceleration is based on a range-based component of acceleration at a particular time that is a sum of the range feedback term and the relative velocity feedback term.

6. The method of claim 5, wherein the range feedback term is modified by a control gain that causes the onboard vehicle computer system to adjust to a sensitivity of a response of the ego vehicle to a range finder sensor based on the control gain.

7. The method of claim 1, wherein the wireless vehicle data describes a velocity of one or more downstream vehicles at one or more specific times, a location of the one or more downstream vehicles with lane-level accuracy at the one or more specific times and one or more kinematics of the one or more downstream vehicles at the one or more specific times.

8. A system of an ego vehicle comprising:
    an onboard vehicle computer system of the ego vehicle that includes a non-transitory memory storing computer code that, when executed by the onboard vehicle computer system, causes the onboard vehicle computer system to:
        determine, from wireless vehicle data that corresponds to a set of downstream vehicles that are downstream of the ego vehicle during a predetermined time period, that the wireless vehicle data describes a presence of a traffic obstruction that is at a location downstream of the ego vehicle;
        determine a preceding velocity of a preceding vehicle that is traveling directly in front of the ego vehicle;
        determine an acceleration for the ego vehicle based on a distance between the ego vehicle and the preceding vehicle, a range feedback term, and a relative velocity feedback term; and
        modify the acceleration of the ego vehicle, wherein the acceleration is modified by the onboard vehicle computer system so that the ego vehicle does not collide with the preceding vehicle or the set of downstream vehicles.

9. The system of claim 8, wherein the computer code further causes the onboard vehicle computer system to:

determine a downstream velocity of a downstream vehicle that is located, when compared to the preceding vehicle, further downstream of the ego vehicle than the preceding vehicle; and modifying an ego velocity of the ego vehicle based on the preceding velocity, the downstream velocity and the presence of the traffic obstruction, wherein the ego velocity is modified so that the ego velocity is less than or substantially equal to the preceding velocity within an initial time period and less than or substantially equal to the downstream velocity and the preceding velocity prior to the ego vehicle arriving at the location of the traffic obstruction so that the ego vehicle does not collide with the preceding vehicle or the downstream vehicle.

10. The system of claim 8, wherein the computer code further causes the onboard vehicle computer system to provide a notification to a driver of the ego vehicle that describes the traffic obstruction or a recommended mitigating action.

11. The system of claim 8, wherein the computer code further causes the onboard vehicle computer system to modify an ego velocity of the ego vehicle by determining an estimated time before the ego vehicle collides with the preceding vehicle based on a relative velocity of the ego vehicle and the preceding vehicle.

12. The system of claim 8, wherein the acceleration is based on a range-based component of acceleration at a particular time that is a sum of the range feedback term and the relative velocity feedback term.

13. The system of claim 12, wherein the range feedback term is modified by a control gain that causes the onboard vehicle computer system to adjust to a sensitivity of a response of the ego vehicle to a range finder sensor based on the control gain.

14. The system of claim 8, wherein the wireless vehicle data describes a velocity of one or more downstream vehicles at one or more specific times, a location of the one or more downstream vehicles with lane-level accuracy at the one or more specific times and one or more kinematics of the one or more downstream vehicles at the one or more specific times.

15. A computer program product comprising a non-transitory memory of an onboard vehicle computer system of an ego vehicle, wherein the non-transitory memory stores computer-executable code that, when executed by the onboard vehicle computer system, causes the onboard vehicle computer system to:

receive a set of wireless messages from a set of vehicles;

extract a subset of the set of wireless messages that were sent within a predetermined time period and that correspond to a set of downstream vehicles that are in a same lane of travel as the ego vehicle and downstream of the ego vehicle, wherein the subset of the set of wireless messages are associated with wireless vehicle data;

determining that the wireless vehicle data indicates a presence of a downstream traffic obstruction affecting a downstream vehicle, a downstream velocity of the downstream vehicle and a location of the downstream traffic obstruction;

determining an acceleration for the ego vehicle based on a distance between the ego vehicle and a preceding vehicle that is traveling directly in front of the ego vehicle, a range feedback term, and a relative velocity feedback term; and modifying the acceleration of the ego vehicle to be consistent with the downstream velocity of the downstream vehicle prior to the ego vehicle arriving at the location of the downstream traffic obstruction.

16. The computer program product of claim 15, wherein the computer-executable code further causes the onboard vehicle computer system to:

determine a downstream velocity of a downstream vehicle that is located, when compared to the preceding vehicle, further downstream of the ego vehicle than the preceding vehicle; and modifying an ego velocity includes modifying the ego velocity of the ego vehicle based on a preceding velocity of the preceding vehicle, the downstream velocity and the presence of the traffic obstruction, wherein the ego velocity is modified so that the ego velocity is less than or substantially equal to the preceding velocity within an initial time period and less than or substantially equal to the downstream velocity and the preceding velocity prior to the ego vehicle arriving at the location of the traffic obstruction so that the ego vehicle does not collide with the preceding vehicle or the downstream vehicle.

17. The computer program product of claim 15, wherein the computer-executable code further causes the onboard vehicle computer to provide a notification to a driver of the ego vehicle that describes the traffic obstruction or a recommended mitigating action.

18. The computer program product of claim 15, wherein the computer-executable code further causes the onboard vehicle computer to modify an ego velocity of the ego vehicle by determining an estimated time before the ego vehicle collides with the preceding vehicle based on a relative velocity of the ego vehicle and the preceding vehicle.

19. The computer program product of claim 15, wherein the acceleration is based on a range-based component of acceleration at a particular time that is a sum of the range feedback term and the relative velocity feedback term.

20. The computer program product of claim 15, wherein the range feedback term is modified by a control gain that causes the onboard vehicle computer system to adjust to a sensitivity of a response of the ego vehicle to a range finder sensor based on the control gain.

* * * * *